United States Patent [19]

Cheney et al.

[11] Patent Number: 5,576,765
[45] Date of Patent: Nov. 19, 1996

[54] VIDEO DECODER

[75] Inventors: Dennis P. Cheney, Vestal; Vincent C. Conzola; Chuck H. Ngai, both of Endwell; Richard T. Pfeiffer, Endicott, all of N.Y.; James E. Phillips, Round Rock, Tex.

[73] Assignee: International Business Machines, Corporation, Armonk, N.Y.

[21] Appl. No.: 214,929

[22] Filed: Mar. 17, 1994

[51] Int. Cl.[6] .................................. H04N 7/30; H04N 7/50
[52] U.S. Cl. .................. 348/407; 348/409; 348/415; 348/412; 348/476; 364/788; 364/787
[58] Field of Search ........................ 348/406, 407, 348/409, 419, 408, 416, 409; 364/757, 758, 759, 786, 787, 788

[56] References Cited

U.S. PATENT DOCUMENTS

| | | | |
|---|---|---|---|
| 4,363,107 | 12/1982 | Ohhashi et al. | 364/758 |
| 4,718,034 | 1/1988 | Takla et al. | 364/784 |
| 4,774,574 | 9/1988 | Daly et al. | 348/419 |
| 4,791,601 | 12/1988 | Tanaka | 364/760 |
| 4,831,578 | 5/1989 | Bui | 364/784 |
| 4,893,269 | 1/1990 | Knauer et al. | 364/784 |
| 4,905,262 | 2/1990 | Eby | 377/44 |
| 5,144,425 | 9/1992 | Joseph | 348/409 |
| 5,187,679 | 2/1993 | Vassiliadis et al. | 364/757 |
| 5,231,484 | 7/1993 | Gonzales et al. | 348/409 |
| 5,267,334 | 11/1993 | Normille et al. | 348/409 |
| 5,329,375 | 7/1994 | Juri et al. | 348/412 |
| 5,369,438 | 11/1994 | Kim | 364/788 |

OTHER PUBLICATIONS

IBM TDB, vol. 23, No. 8, Jan. 1981 "4–2 Carry–Save Adder Module".
IBM TDB, vol. 24, No. 1A, Jun. 81, "3–2 Carry–Save Adder Module".
IBM TDB, vol. 33, No. 6B, Nov. 1990, "Fast Carry Save Adder".

*Primary Examiner*—Tommy P. Chin
*Assistant Examiner*—Amand Rao
*Attorney, Agent, or Firm*—Richard M. Goldman

[57] ABSTRACT

A digital signal decoder system for receiving compressed encoded digitized video signals and transmitting decompressed decoded digital video signals includes a FIFO Data Buffer, a RAM having (1) a compressed, encoded Data Buffer and (2) a data portion for storing decompressed digital video buffer data. A Memory Management Unit is provided for managing the RAM. The decoder has a decoder processor that includes a Variable Length Code Decoder for receiving encoded data, a (2,3,3) parallel counter based Inverse Quantizer for dequantizing the decoded data, an Inverse Discrete Cosine Transform Decoder for transforming the dequantized, decoded data into Intrapictures, Predicted Pictures, and Bidirectional predicted Pictures, a Motion Compensator for receiving Intrapictures and other information from the RAM, and error functions, and forming motion compensated predicted pictures therefrom for return to the RAM, a Display Unit to output motion compensated pictures from the RAM, and a reduced instruction set Controller to control the Memory Management Unit, the Variable Length Code Decoder, the Inverse Quantizer, the Inverse Discrete Cosine Transform Decoder, the Motion Compensator, and the Display Unit.

5 Claims, 23 Drawing Sheets

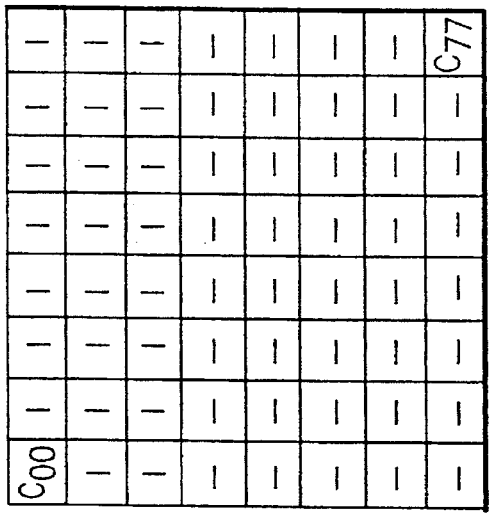
DISCRETE COSINE TRANSFORM
$$y_{kl} = \frac{c(k)c(l)}{4} \frac{n}{2} \sum_{i=0}^{n} \frac{n}{2} \sum_{j=0} x_{ij} \cos\left(\frac{(2i+1)k\pi}{16}\right) \cos\left(\frac{(2j+1)l\pi}{16}\right)$$
COEFFICIENTS
QUANTIZE, "ZIG ZAG"
0001101010110011
QUANTIZED, ZIG ZAGGED
COEFFICIENT LOST SYSTEM
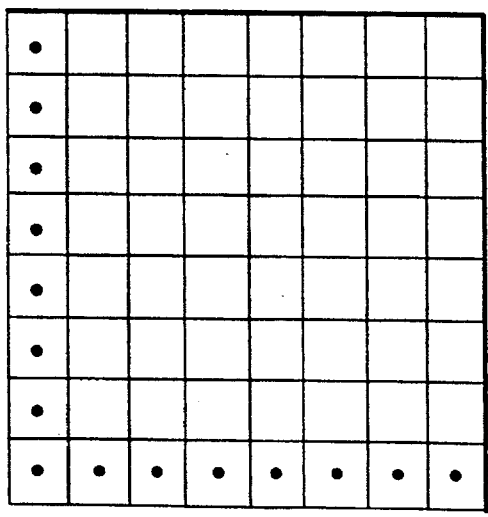
64 PIXELS
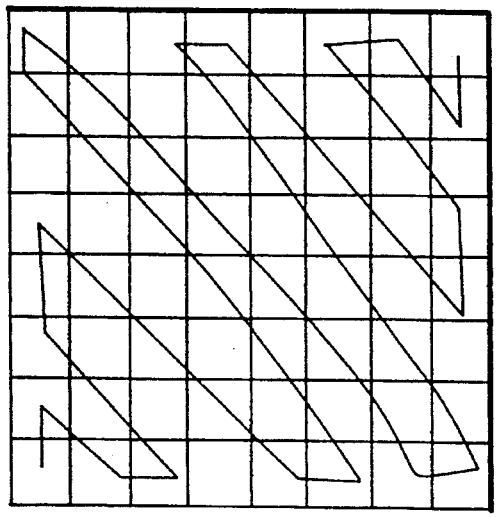
FIG.2

| SYMBOL ADDRESS | SYMBOL LENGTH | NOTE |
|---|---|---|
| 0 0 0 X X X X | VARIES | MAINLY FOR PROCESSOR USE |
| 0 0 1 X X X X | 1 BIT | |
| 0 1 0 X X X X | 2 BIT | |
| 0 1 1 X X X X | 3 BIT | |
| 1 0 0 X X X X | 8 BIT | |
| 1 0 1 X X X X | MIXED | SPECIFY LENGTH |
| 1 1 0 X X X X | MIXED | SPECIFY LENGTH |
| 1 1 1 X X X X | VLC | NEED TABLE LOOKUP |

| RANGE-CODE | RANGE | SIGN BIT |
|---|---|---|
| 0 | 2048 | BIT 11 |
| 1 | 16 | BIT 4 |
| 2 | 32 | BIT 5 |
| 3 | 64 | BIT 6 |
| 4 | 128 | BIT 7 |
| 5 | 256 | BIT 8 |
| 6 | 512 | BIT 9 |
| 7 | 1024 | BIT 10 |

EXAMPLE: F-CODE=2, RANGE=32

$(-21)+(-16) = -37$
$(-37)+(2*32) = 27$

```
  1111 1111 1110 1011 = -21
+ 1111 1111 1111 0000 = -16
  ─────────────────────
  1111 1111 1101 1011 = -37
              ←─────── S
  0000 0000 0001 1011 = 27
```

NOTE: RANGE-CODE = F-CODE   EXCEPT RANGE-CODE 0 = F-CODE 8

PICOWORD FIELD DESCRIPTION
IMMEDIATE WORD TYPE

| 0 | 0 | 0 | 0 | 0 | 0 | 0 | 0 | 0 | 0 | 1 | 1 | 1 | 1 | 1 | 1 |
|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 |
| 0 | 0 | 0 | FUNCT | | LOW | WR/TYPE | | CONSTANT | | | | | | | |

FIG.13A

FUNCTION FIELD

| BITS 3,4 | FIELD DEFINITION | MNEMONIC |
|---|---|---|
| 00 | LOAD | LD |
| 01 | AND | AND |
| 10 | EXCLUSIVE OR | XOR |
| 11 | LOAD COMMAND | LDCMD |

FIG.13B

LOW BYTE FIELD

| BIT 5 | FIELD DEFINITION | MNEMONIC |
|---|---|---|
| 0 | HIGH BYTE | HI |
| 1 | LOW BYTE | LO |

FIG.13C

WORK REGISTER ADDRESS FIELD-WHEN FUNCTION ⌐ = 11

| BITS 6,7 | FIELD DEFINITION | MNEMONIC |
|---|---|---|
| 00 | WORK REGISTER 0 | WK0 |
| 01 | WORK REGISTER 1 | WK1 |
| 10 | WORK REGISTER 2 | WK2 |
| 11 | WORK REGISTER 3 | WK3 |

FIG.13D

COMMAND TYPE FIELD-WHEN FUNCTION = 11

| BITS 6,7 | FIELD DEFINITION | MNEMONIC |
|---|---|---|
| 00 | COMMAND | CMD |
| 01 | RESERVED | |
| 10 | RESERVED | |
| 11 | RESERVED | |

FIG.13E

CONSTANT FIELD

| BITS 8,15 | FIELD DEFINITION | MNEMONIC |
|---|---|---|
| 00-FF | CONSTANT | HEX VALUE |

FIG.13F

ADD WORD TYPE

| 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 |
|---|---|---|---|---|---|---|---|---|---|---|---|---|---|---|---|
| 0 | 0 | 1 | SUB | CI | CTL | WK | REG | DST | SYMBOL ADDRESS ||||||

FIG.14A

SUBTRACT FIELD

| BIT 3 | FIELD DEFINITION | MNEMONIC |
|---|---|---|
| 0 | ADDITION | ADD |
| 1 | SUBTRACTION | SUB |

FIG.14B

CARRY IN CONTROL FIELD

| BITS 4,5 | FIELD DEFINITION | MNEMONIC |
|---|---|---|
| 00 | CARRY IN = 0 | CI0 |
| 01 | CARRY IN = 1 | CI1 |
| 10 | PREVIOUS CARRY OUT | PC |
| 11 | SPECIAL ADD | SP |

FIG.14C

WORK REGISTER ADDRESS FIELD—WHEN FUNCTION CI CTL¬ = 11

| BITS 6,7 | FIELD DEFINITION | MNEMONIC |
|---|---|---|
| 00 | WORK REGISTER 0 | WK0 |
| 01 | WORK REGISTER 1 | WK1 |
| 10 | WORK REGISTER 2 | WK2 |
| 11 | WORK REGISTER 3 | WK3 |

FIG.14D

SPECIAL ADD FIELD – WHEN CI CTL = 11

| BITS 6,7 | FIELD DEFINITION | MNEMONIC |
|---|---|---|
| 00 | INCREMENT BY 1 | +1 |
| 01 | DECREMENT BY 1 | −1 |
| 10 | RESERVED | |
| 11 | RESERVED | |

FIG.14E

DESTINATION FIELD

| BIT 8 | FIELD DEFINITION | MNEMONIC |
|---|---|---|
| 0 | DESTINE WORK REG 0 | WK0 |
| 1 | DESTINE SYMBOL | DES |

FIG.14F

SYMBOL ADDRESS FIELD

| BITS 9-15 | FIELD DEFINITION | MNEMONIC |
|---|---|---|
| 00-7F | DEFINED IN SYMBOL TABLE | |

FIG.14G

SHIFT WORD TYPE

| 0 | 0 | 0 | 0 | 0 | 0 | 0 | 0 | 0 | 0 | 1 | 1 | 1 | 1 | 1 | 1 |
|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 |
| 0 | 0 | 1 | RT | \multicolumn{4}{c}{SHIFT AMOUNT} | DST | \multicolumn{6}{c}{SYMBOL ADDRESS} |

| 0 | 0 | 1 | RT | SHIFT AMOUNT | | | | DST | SYMBOL ADDRESS | | | | | | |

FIG.16A

RIGHT SHIFT FIELD

| BIT 3 | FIELD DEFINITION | MNEMONIC |
|---|---|---|
| 0 | LEFT SHIFT | SL |
| 1 | RIGHT SHIFT | SR |

FIG.16B

SHIFT AMOUNT FIELD

| BITS 4-7 | FIELD DEFINITION | MNEMONIC |
|---|---|---|
| 0000 | USE SHIFT INDIRECT REGISTER | SIR |
| 1-F | SHIFT AMOUNT | HEX VALUE |

FIG.16C

DESTINATION FIELD

| BIT 8 | FIELD DEFINITION | MNEMONIC |
|---|---|---|
| 0 | DESTINE WORK REG 0 | WK0 |
| 1 | DESTINE SYMBOL | DES |

FIG.16D

SYMBOL ADDRESS FIELD

| BITS 9-15 | FIELD DEFINITION | MNEMONIC |
|---|---|---|
| 00-7F | DEFINED IN SYMBOL TABLE | |

FIG.16E

SPECIAL ARITHMETIC WORD TYPE

| 0 | 0 | 0 | 0 | 0 | 0 | 0 | 0 | 0 | 0 | 1 | 1 | 1 | 1 | 1 | 1 |
|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 |
| 0 | 1 | 0 | FUNCT. | | | WK REG | | DST | SYMBOL ADDRESS | | | | | | |

FIG.15A

FUNCTION FIELD

| BITS 3-5 | FIELD DEFINITION | MNEMONIC |
|---|---|---|
| 000 | CLEAR | CLR |
| 001 | MOVE | MOVE |
| 010 | LOAD POSITIVE | LDP |
| 011 | LOAD NEGATIVE | LDN |
| 100 | MULTIPLY | MULT |
| 101 | RESERVED | |
| 110 | MODULO ADD | MADD |
| 111 | RESERVED | |

FIG.15B

WORK REGISTER ADDRESS FIELD

| BITS 6,7 | FIELD DEFINITION | MNEMONIC |
|---|---|---|
| 00 | WORK REGISTER 0 | WK0 |
| 01 | WORK REGISTER 1 | WK1 |
| 10 | WORK REGISTER 2 | WK2 |
| 11 | WORK REGISTER 3 | WK3 |

FIG.15C

DESTINATION FIELD

| BIT 8 | FIELD DEFINITION | MNEMONIC |
|---|---|---|
| 0 | SOURCE SYMBOL, DESTINE WORK REG | WK |
| 1 | SOURCE WORK REG, DESTINE SYMBOL | DES |

FIG.15D

SYMBOL ADDRESS FIELD

| BITS 9-115 | FIELD DEFINITION | MNEMONIC |
|---|---|---|
| 00-7F | DEFINED IN SYMBOL TABLE | |

FIG.15E

READ SYMBOL WORD TYPE

| 0 | 0 | 0 | 0 | 0 | 0 | 0 | 0 | 0 | 0 | 1 | 1 | 1 | 1 | 1 | 1 |
|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 |
| 1 | 0 | 0 | FAST BR COND ||||BR CTL || SYMBOL ADDRESS ||||||

FIG.17A

FAST BRANCH CONDITION FIELD-WHEN BR CTL ¬= 11

| BITS 3-6 | FIELD DEFINITION | MNEMONIC |
|---|---|---|
| 0000 | UNCONDITIONAL | UNC |
| 0001 | FLAG BIT = 0 | FB0 |
| 0010 | START CODE | SC |
| 0011 | 23 ZEROS | Z23 |
| 0100 | END OF BLOCK | EOB |
| 0101 | END OF MACROBLOCK | EOMB |
| 0110 | ¬(MBA STUFFING OR MBA ESCAPE) | NSESC |
| 0111 | F-CODE= 1 OR VLC = 1 | FCM |

FIG.17B

SYMBOL LENGTH FIELD-WHEN BR CTL = 11

| BITS 3-6 | FIELD DEFINITION | MNEMONIC |
|---|---|---|
| 0-F | LENGTH (1-15 BITS, 0000=16 BITS) | HEX VALUE |

FIG.17C

BRANCH CONTROL FIELD

| BITS 7,8 | FIELD DEFINITION | MNEMONIC |
|---|---|---|
| 00 | CONTINUE | CONT |
| 01 | STAY UNTIL CONDITION | STAY |
| 10 | SKIP ON CONDITION | SKIP |
| 11 | CONTINUE-USE BITS 3-6 AS SYMBOL LENGTH | LENG |

FIG.17D

SYMBOL ADDRESS FIELD

| BITS 9-15 | FIELD DEFINITION | MNEMONIC |
|---|---|---|
| 00-7F | DEFINED IN SYMBOL TABLE | |

FIG.17E

BRANCH WORD TYPE

| 0 | 0 | 0 | 0 | 0 | 0 | 0 | 0 | 0 | 0 | 1 | 1 | 1 | 1 | 1 | 1 |
|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 |
| 1 | 0 | 1 | EX | BR COND | | | BRANCH ADDRESS | | | | | | | | |

FIG.18A

EXECUTE FIELD

| BIT 3 | FIELD DEFINITION | MNEMONIC |
|---|---|---|
| 0 | NO EXECUTION ON NEXT WORD | BR |
| 1 | EXECUTE NEXT WORD | BRX |

FIG.18B

BRANCH CONDITION FIELD

| BITS 4-6 | FIELD DEFINITION | MNEMONIC |
|---|---|---|
| 000 | UNCONDITIONAL | UNC |
| 001 | WORK REG 0 = 0 | WK0=0 |
| 010 | WORK REG 0 ¬= 0 | WK0N0 |
| 011 | CARRY OUT = 1 | C1 |
| 100 | SIGN = 0 | S0 |
| 101 | SIGN = 1 | S1 |
| 110 | RESULT = 0 | R0 |
| 111 | RESULT ¬= 0 | RN0 |

FIG.18C

BRANCH ADDRESS FIELD

| BITS 7-15 | FIELD DEFINITION | MNEMONIC |
|---|---|---|
| 000-1FF | BRANCH ADDRESS | HEX VALUE |

FIG.18D

BRANCH RETURN WORD TYPE

| 0 | 0 | 0 | 0 | 0 | 0 | 0 | 0 | 0 | 0 | 1 | 1 | 1 | 1 | 1 | 1 |
|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 |
| 1 | 1 | 0 | EX | RTN | | | BRANCH ADDRESS ||||||||||

FIG. 19A

EXECUTE FIELD

| BIT 3 | FIELD DEFINITION | MNEMONIC |
|---|---|---|
| 0 | NO EXECUTION ON NEXT WORD | BS |
| 1 | EXECUTE NEXT WORD | BSX |

FIG. 19B

RETURN FIELD

| BIT 4 | FIELD DEFINITION | MNEMONIC |
|---|---|---|
| 0 | BRANCH TO SUBROUTINE | UNC |
| 1 | RETURN FROM SUBROUTINE | RTN |

FIG. 19C

BRANCH ADDRESS FIELD

| BITS 7-15 | FIELD DEFINITION | MNEMONIC |
|---|---|---|
| 000-1FF | BRANCH ADDRESS | HEX VALUE |

FIG. 19D

SYMBOL ADDRESS PARTITION

| SYMBOL ADDRESS | SYMBOL LENGTH | NOTE |
|---|---|---|
| 0 0 0 X X X X | VARIES | MAINLY FOR PROCESSOR USE |
| 0 0 1 X X X X | 1 BIT | |
| 0 1 0 X X X X | 2 BIT | |
| 0 1 1 X X X X | 3 BIT | |
| 1 0 0 X X X X | 8 BIT | |
| 1 0 1 X X X X | MIXED | SPECIFY LENGTH |
| 1 1 0 X X X X | MIXED | SPECIFY LENGTH |
| 1 1 1 X X X X | VLC | NEED TABLE LOOKUP |

FIG.20

| SYMBOL ADDRESS | SYMBOL NAME | BITS |
|---|---|---|
| 1 0 0 0 0 0 0 | I_MATRIX | 8 |
| 1 0 0 0 0 0 1 | NI_MATRIX | 8 |
| 1 0 0 0 0 1 0 | START_CODE | 8 |
| 1 0 0 0 0 1 1 | DUMMY8 | 0 |
| 1 0 0 0 1 0 0 | DCD_CNTRL | 16 |
| 1 0 0 0 1 0 1 | MCU_CNTRL | 8 |
| 1 0 0 1 0 0 0 | FL_H_MV | 16 |
| 1 0 0 1 0 0 1 | FL_V_MV | 16 |

FIG.21D

| SYMBOL ADDRESS | SYMBOL NAME | BITS |
|---|---|---|
| 0 0 0 0 0 0 0 | WK0 | 16 |
| 0 0 0 0 0 0 1 | WK1 | 16 |
| 0 0 0 0 0 1 0 | WK2 | 16 |
| 0 0 0 0 0 1 1 | WK3 | 16 |
| 0 0 0 0 1 0 0 | DUMMY0 | 0 |
| 0 0 0 0 1 0 1 | ABS_MBA | 11 |
| 0 0 0 0 1 1 0 | SIR | 4 |
| 0 0 0 0 1 1 1 | FLD_INDEX | 2 |
| 0 0 0 1 0 0 0 | FL_LUM_OFF | 20 |
| 0 0 0 1 0 0 1 | FL_CHR_OFF | 20 |
| 0 0 0 1 0 1 0 | LUM_OFFSET | 20 |
| 0 0 0 1 0 1 1 | CHR_OFFSET | 20 |

FIG.21A

| SYMBOL ADDRESS | SYMBOL NAME | BITS |
| --- | --- | --- |
| 0 0 1 0 0 0 0 | FLAG | 1 |
| 0 0 1 0 0 0 1 | INTRA_VLC_FMT | 1 |
| 0 0 1 0 0 1 0 | CONCEAL_MV | 1 |
| 0 0 1 0 0 1 1 | CLOSED_GOP | 1 |
| 0 0 1 0 1 0 0 | BROKEN_LINK | 1 |
| 0 0 1 0 1 0 1 | FULL_PEL_FWD_VEC | 1 |
| 0 0 1 0 1 1 0 | FULL_PEL_BWD_VEC | 1 |
| 0 0 1 0 1 1 1 | CHROM_PP_TYPE | 1 |
| 0 0 1 1 0 0 0 | QSCALE_TYPE | 1 |
| 0 0 1 1 0 0 1 | DCT_TYPE | 1 |
| 0 0 1 1 0 1 0 | M_VERT_FIELD_SEL | 1 |
| 0 0 1 1 0 1 1 | DUMMY1 | 0 |
| 0 0 1 1 1 0 0 | IQ_T_LD | 1 |
| 0 0 1 1 1 0 1 | NIQ_T_LD | 1 |
| 0 0 1 1 1 1 0 | FR_PRED_FR_DCT | 1 |
| 0 0 1 1 1 1 1 | SCAN_SEL | 1 |

FIG.21B

| SYMBOL ADDRESS | SYMBOL NAME | BITS |
|---|---|---|
| 0 1 0 0 0 0 0 | CHROMA_FMT | 2 |
| 0 1 0 0 0 0 1 | PIC_STRUCT | 2 |
| 0 1 0 0 1 0 0 | INTRA_DC_PREC | 2 |
| 0 1 0 0 1 0 1 | FRM_M_TYPE | 2 |
| 0 1 0 0 1 1 0 | FLD_M_TYPE | 2 |
| 0 1 0 0 1 1 1 | CS_ADDR_SW | 2 |
| 0 1 0 1 0 0 0 | SPARE_0 | 16 |
| 0 1 0 1 0 0 1 | SPARE_1 | 16 |
| 0 1 0 1 1 0 1 | RATE_BUF_WRAP | 16 |
| 0 1 0 1 1 1 0 | BASE_ADDR_INDEX | 4 |
| 0 1 0 1 1 1 1 | BASE_ADDR | 16 |
| 0 1 1 0 0 0 0 | F_CODE | 4 |
| 0 1 1 0 0 0 1 | F_CODE_RT | 4 |
| 0 1 1 0 1 0 1 | PIC_TYPE | 3 |
| 0 1 1 0 1 1 0 | VERT_SEL | 1 |
| 0 1 1 0 1 1 1 | BWD_SEL | 1 |
| 0 1 1 1 0 0 0 | DC_COEFF | 12 |
| 0 1 1 1 0 0 1 | MPEG1 | 1 |
| 0 1 1 1 1 0 0 | INTRA_T_ADDR | 6 |
| 0 1 1 1 1 0 1 | NON_INTRA_T_ADDR | 6 |

FIG.21C

| SYMBOL ADDRESS | SYMBOL NAME | BITS |
|---|---|---|
| 1 0 1 0 0 0 0 | DISP_H_DIM | 14 |
| 1 0 1 0 0 0 1 | DISP_V_DIM | 14 |
| 1 0 1 0 0 1 0 | PAN_H_OFFSET | 12 |
| 1 0 1 0 0 1 1 | PAN_V_OFFSET | 12 |
| 1 0 1 0 1 0 0 | PAN_LUM_OFF | 20 |
| 1 0 1 0 1 0 1 | PAN_CHR_OFF | 20 |
| 1 0 1 0 1 1 0 | INDEX_ADDR | 16 |
| 1 0 1 0 1 1 1 | MODULO | 16 |
| 1 0 1 1 0 0 0 | FRM_BFR_SIZE | 16 |
| 1 0 1 1 0 0 1 | DCU_CNTRL | 16 |
| 1 0 1 1 0 1 0 | DATA_BFR_ADDR | 6 |
| 1 0 1 1 0 1 1 | DATA_BFR | 16 |
| 1 0 1 1 1 0 0 | CMD_ADDR | 2 |
| 1 0 1 1 1 0 1 | CMD_PARM | 16 |
| 1 0 1 1 1 1 0 | HOST_CMD | 5 |
| 1 0 1 1 1 1 1 | HOST_CMD_STAT | 1 |

FIG.21E

| SYMBOL ADDRESS | SYMBOL NAME | BITS |
|---|---|---|
| 1 1 0 0 0 0 0 | PEL_ASP_RATIO | 4 |
| 1 1 0 0 0 0 1 | PIC_RATE | 4 |
| 1 1 0 0 0 1 0 | NON_INT_SEQ | 1 |
| 1 1 0 0 0 1 1 | TEMPORAL_REF | 10 |
| 1 1 0 0 1 0 0 | H_SIZE | 12 |
| 1 1 0 0 1 0 1 | V_SIZE | 12 |
| 1 1 0 0 1 1 0 | TOP_FLD_FIRST | 1 |
| 1 1 0 0 1 1 1 | NUM_FLD_DISP | 1 |
| 1 1 0 1 0 0 0 | QSCALE | 5 |
| 1 1 0 1 0 0 1 | DISP_DLY | 9 |
| 1 1 0 1 0 1 0 | SC_SEARCH | |
| 1 1 0 1 0 1 1 | NON_INT_FRM | 1 |
| 1 1 0 1 1 0 0 | DISP_COEFF1 | 10 |
| 1 1 0 1 1 0 1 | DISP_COEFF2 | 10 |
| 1 1 0 1 1 1 0 | DISP_COEFF3 | 10 |
| 1 1 0 1 1 1 1 | DISP_COEFF4 | 10 |

FIG.21F

VIDEO DECODER

FIELD OF THE INVENTION

This invention relates to video decoders, especially video decoders intended to decode and decompress compressed encoded video signals, e.g., discrete cosine transform encoded video signals. The method, apparatus, and system of the invention are useful in decoding broadcast signals, cablecast signals, and digital network signals, as well as in high definition television, interactive television, multimedia, video on demand, video conferencing, and digital video recording. The system and apparatus of the invention may be a "stand alone" unit, as a set top box or a digital entertainment terminal, or the like, as a component of a television set, a personal computer, work station, or other computer, as a unit contained on one or more printed circuit boards, or as part of a video recorder or dedicated teleconferencing unit.

BACKGROUND OF THE INVENTION

The Moving Picture Experts' Group (MPEG) MPEG-2 Draft Standard is a compression/decompression standard for interactive video applications. The standard describes an encoding method that results in substantial bandwidth reduction by a subjective lossy compression followed by a lossless compression. The encoded, compressed digital video data is subsequently decompressed and decoded in an PEG-2 Draft Standard compliant decoder.

The MPEG-2 Draft Standard is described in, e.g., C.A. Gonzales and E. Viscito, "Motion Video Adaptive Quantization In The Transform Domain," *IEEE Trans Circuits Syst Video Technol*, Volume 1, No. 4, Dec. 1991, pp. 374–378, E. Viscito and C.A. Gonzales, "Encoding of Motion Video Sequences for the MPEG Environment Using Arithmetic Coding," *SPIE*, Vol 1360, pp. 1572–1576, (1990), D. LeGall, "MPEG: A Video Compression Standard for Multimedia Applications," *Communications of the ACM*, Vol. 34, No. 4, (April 1991), pp. 46–58, S. Purcell and D. Galbi, "C Cube MPEG Video Processor," *SPIE*, v. 1659, (1992) pp 24–29, and D. J. LeGall, "MPEG Video Compression Algorithm," *Signal Process Image Commun*, v. 4, n. 2, (1992), pp. 129–140, among others.

The MPEG-2 Draft Standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 Draft Standard result in a balance between intraframe encoding alone and interframe encoding alone.

The MPEG-2 Draft Standard exploits temporal redundancy for motion compensated interpolative and predictive encoding. That is, the assumption is made that "locally" the current picture can be modelled as a translation of the picture at a previous and/or future time. "Locally" means that the amplitude and direction of the displacement are not the same everywhere in the picture.

MPEG-2 Draft Standard specifies predictive and interpolative interframe encoding and frequency domain intraframe encoding. It has block based motion compensation for the reduction of temporal redundancy, and Discrete Cosine Transform based compression for the reduction of spatial redundancy. Under MPEG-2 Draft Standard motion compensation is achieved by predictive coding, interpolative coding, and Variable Length Coded motion vectors. The information relative to motion is based on a 16×16 array of pixels and is transmitted with the spatial information. It is compressed with Variable Length Codes, such as Huffman codes.

The MPEG-2 Draft Standard provides temporal redundancy reduction through the use of various predictive and interpolative tools. This is illustrated in FIG. 1. FIG. 1 shows three types of frames or pictures, "I" Intrapictures, "P" Predicted Pictures, and "B" Bidirectional Interpolated Pictures.

The "I" Intrapictures provide moderate compression, and are access points for random access, e.g., in the case of video tapes or CD ROMS. As a matter of convenience, one "I" Intrapicture is provided approximately every half second. The "I" Intrapicture only gets information from itself. It does not receive information from an "P" Predicted Picture or "B" Bidirectional Interpolated Picture. Scene cuts preferably occur at "I" Intrapictures.

"P" Predicted Pictures are coded with respect to a previous picture. "P" Predicted Pictures are used as the reference for future pictures, both "P" and "B" pictures.

"B" Bidirectional Coded pictures have the highest degree of compression. They require both a past picture and a future picture for reconstruction. "B" bidirectional pictures are never used as a reference.

Motion compensation goes to the redundancy between pictures. The formation of "P" Predicted Pictures from "I" Intrapictures and of "B" Bidirectional Coded Pictures from a pair of past and future pictures is a key feature of the MPEG-2 Draft Standard technique.

The motion compensation unit under the MPEG-2 Draft Standard is the Macroblock unit. The MPEG-2 Draft Standard Macroblocks are 16×16 pixels. Motion information consists of one vector for forward predicted macroblocks, one vector for backward predicted macroblocks, and two vectors for bidirectionally predicted macroblocks. The motion information associated with each macroblock is coded differentially with respect to the motion information present in the reference macroblock. In this way a macroblock of pixels is predicted by a translation of a macroblock of pixels from a past or future picture.

The difference between the source pixels and the predicted pixels is included in the corresponding bit stream. The decoder adds a correction term to the block of predicted pixels to produce the reconstructed block.

As described above and illustrated in FIG. 1, each macroblock of a "P" Predicted Picture can be coded with respect to the closest previous "I" Intrapicture, or with respect to the closest previous "P" Predicted Picture.

Further, as described above and illustrated in FIG. 1, each macroblock of a "B" Bidirectional Picture can be coded by forward prediction from the closest past "I" or "P" Picture, by backward prediction from the closest future "I" or "P" Picture, or bidirectionally, using both the closest past "I" or "P" picture and the closest "future" "I" or "P" picture. Full bidirectional prediction is the least noisy prediction.

Motion information is sent with each macroblock to show what part of the reference picture is to be used as a predictor.

As noted above, motion vectors are coded differentially with respect to motion vectors of the previous adjacent block. Variable Length Coding is used to code the differential motion vector so that only a small number of bits are needed to code the motion vector in the common case, where the motion vector for a macroblock is nearly equal to the motion vector for a preceding macroblock.

Spatial redundancy is the redundancy within a picture. Because of the macroblock based nature of the motion compensation process, described above, it was desirable for the MPEG-2 Draft Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8x8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After transformation, many of the frequency coefficients are zero, especially the coefficients for high spatial frequencies. These coefficients are organized into a zig-zag, as shown in FIG. 2, and converted into run-amplitude (run-level) pairs. Each pair indicates the number of zero coefficients and the amplitude of the non-zero coefficient. This is coded in a Variable Length Code.

Discrete Cosine Transformation encoding is carried out in the three stages as shown in FIG. 2. The first stage is the computation of the Discrete Cosine Transformation coefficients. The second step is the quantization of the coefficients. The third step is the conversion of the quantized transform coefficients into {run-amplitude} pairs after reorganization of the data into zig-zag scanning order.

Quantization enables very high degrees of compression, and a high output bit rate, and retains high picture quality.

Quantization can be adaptive, with "I" Intrapictures having fine quantization to avoid "blockiness" in the reconstructed image. This is important because "I" Intrapictures contain energy at all frequencies. By way of contrast, "P" and "B" pictures contain predominantly high frequency energy and can be coded at a coarser quantization.

The MPEG-2 Draft Standard specifies a layered structure of syntax and bit stream. The bit stream is separated into logically distinct entities to prevent ambiguities and facilitate decoding. The six layers are shown in Table 1, below

TABLE 1

MPEG-2 Draft Standard Layers

| Layer | Purpose |
| --- | --- |
| Sequence Layer | Random Access Unit and Context |
| Group of Pictures Layer | Random Access Unit and Video Coding |
| Picture Layer | Primary Coding Unit |
| Slice Layer | Resynchronization Unit |
| Macroblock Layer | Motion Compensation Unit |
| Block Layer | DCT Unit |

OBJECTS OF THE INVENTION

It is one object of the invention to provide a system that increases the speed of the decoding process.

It is another object of the invention to provide an integrated decoder system that can be incorporated in other video and entertainment products.

It is still another object of the invention to reduce the clock cycles required for decoding a picture.

SUMMARY OF THE INVENTION

These and other objects of the invention are attained by the digital signal decoder system of the invention. The system is useful for receiving encoded compressed digital video signals and transmitting decoded digital video signals. The elements of the decoder system include a FIFO data buffer, a variable length code decoder, a dequantizer, a discrete cosine transform invertor, a motion compensator, a display unit video output, and a controller or controller.

The FIFO Data Buffer receives compressed, encoded, digital video data from a cablecast or telecast network, another network, or an upstream apparatus or system, and temporarily stores the data, under control of the host processor, before transfer to memory.

The system also includes a random access memory (RAM). The RAM, which may be a SRAM, a DRAM, or a set of latches, serves two purposes. The RAM receives the compressed, encoded digital data for storage in a compressed, encoded Data Buffer that is connected to the FIFO Data Buffer. This portion of the RAM, which may be a separate integrated circuit chip or chips, or incorporated into a single integrated circuit chip or chips, or main memory, is adapted to receive and store encoded compressed digital video data from the FIFO. The RAM also includes a data portion for storing decompressed decoded digital video pictures.

A Memory Management Unit is provided for managing the RAM.

The system includes a Variable Length Code Decoder, e.g., a Huffman decoder, for receiving encoded compressed data from the RAM. This data is received from the compressed, encoded Data Buffer portion of the RAM. The Variable Length Code Decoder provides a decoded bit stream for further processing.

The system next includes an Inverse Quantizer for dequantizing the decoded data from the Variable Length Code Decoder. The Inverse Quantizer is characterized by several multiplication circuits where n–2 reduction is accomplished using (2,3,3) parallel counters.

The system includes an Inverse Discrete Cosine Transform Decoder for transforming the dequantized, decoded data from the Inverse Quantizer from the frequency domain to the spacial domain in blocks of 8×8 pixel units.

The system also includes a Motion Compensator for receiving Intrapictures and other information from the RAM, and error functions from the Inverse Discrete Cosine Transform Decoder, and forming motion compensated Predicted Pictures therefrom for return to the RAM.

The output of the system is through a Display Unit. The Display Unit provides an output of decoded, decompressed, motion compensated pictures from the RAM.

The individual elements of the unit are under the control of a Controller or Controller. The Controller, a Reduced Instruction Set Controller, with f-modulo add capability, controls the Memory Management Unit, the Variable Length Code Decoder, the Inverse Quantizer, the Inverse Discrete Cosine Transform Decoder, the Motion Compensator, and the Display Unit.

The system can work with various downstream video elements, such as a digital computer, a television set, a recorder, or a network. The video decoder can be in combination with an audio decoder, separated therefrom by a suitable demultiplexer.

The decoder system of the invention can be included in a stand-alone system, as a separate accessory, that is, a "set top box." Alternatively, the decoder of the system can be integrally incorporated into the television set, computer, or other video device. Thus, the decoder can be integrated with a downstream element such as a digital computer, a television set, a recorder, or a network. In this alternative embodiment the decoder system is incorporated on one or more printed circuit boards in the downstream element.

The system of the invention can be in the form of a digital signal decoder system of a main memory and processor for receiving compressed encoded digital video signals and transmitting decompressed decoded digital video signals. The main memory has (1) a compressed, encoded Data Buffer adapted to receive and store encoded compressed digital video data, and (2) a data portion for storing decompressed digital video buffer, and a Memory Management Unit for managing the RAM. The decoder system can be a single integrated circuit chip having the FIFO Data Buffer, the Variable Length Code Decoder, the Inverse Quantizer, the Inverse Discrete Cosine Transform Decoder, the Motion Compensator, the Display Unit, and the Controller.

According to a further embodiment of the invention there is provided an integrated circuit chip having the FIFO Data Buffer, the Variable Length Code Decoder, the Inverse Quantizer, the Inverse Discrete Cosine Transform Decoder, the Motion Compensator, the Display Unit, and the Controller.

According to a still further embodiment of the invention there is provided a complete digital video and audio entertainment system or a digital video and audio information system including the digital signal decoder system for receiving encoded compressed digital video signals and transmitting decoded decompressed digital video signals, for example to a consumer television set, a teleconferencing unit, a computer, or a redistribution network. The system includes main memory, the FIFO Data Buffer, the Variable Length Code Decoder, the Inverse Quantizer, the Inverse Discrete Cosine Transform Decoder, the Motion Compensator, the Display Unit, and the Controller, as well as an audio decoder unit and an output unit such as a television set, a recorder, a computer, or a network for rebroadcast.

THE FIGURES

The invention may be further understood by reference to the Figures appended hereto.

FIG. 2 shows the sequence of compressing a frame or picture, including calculating the Discrete Cosine Transform coefficients, quantizing the Discrete Cosine Transform coefficients, and "zig-zagging" the quantizied Discrete Cosine Transform coefficients.

FIG. 13 shows the IMMEDIATE word type format.

FIG. 14 shows the ADD word type format.

FIG. 15 shows the SPECIAL ARITHMETIC word type format.

FIG. 16 shows the SHIFT word type format.

FIG. 17 shows the READ SYMBOL word type format.

FIG. 18 shows the BRANCH word type format.

FIG. 19 shows the BRANCH RETURN word type format.

FIG. 20 shows the SYMBOL ADDRESS partition.

FIGS. 21A, 21B, 21C, 21D, 21E and 21F show the symbol address table.

DETAILED DESCRIPTION OF THE INVENTION

The systems, method, and apparatus of the invention receive encoded, compressed digital video data from a host interface bus, decompress and decode the digital video data, and deliver decompressed, decoded digital video data to a display interface, also referred to herein as a pixel bus. Conversion from digital data to analog data is done externally of the system, although in one embodiment, a digital to analog converter (DAC) can be incorporated into the system downstream of the pixel bus.

In a preferred embodiment of the invention the decoder system complies fully with the Moving Picture Experts Group MPEG-2 Draft Standard Main Profile at the Main Level, as defined in the MPEG documentation. Thus, the system can receive compressed video data at a rate of 15 Mbs/second, and the system can operate at a 40 MHz clock frequency. In the MPEG-2 Draft Standard the data format for the compressed, encoded data is YCbCr (4:2:0).

Figure 1:
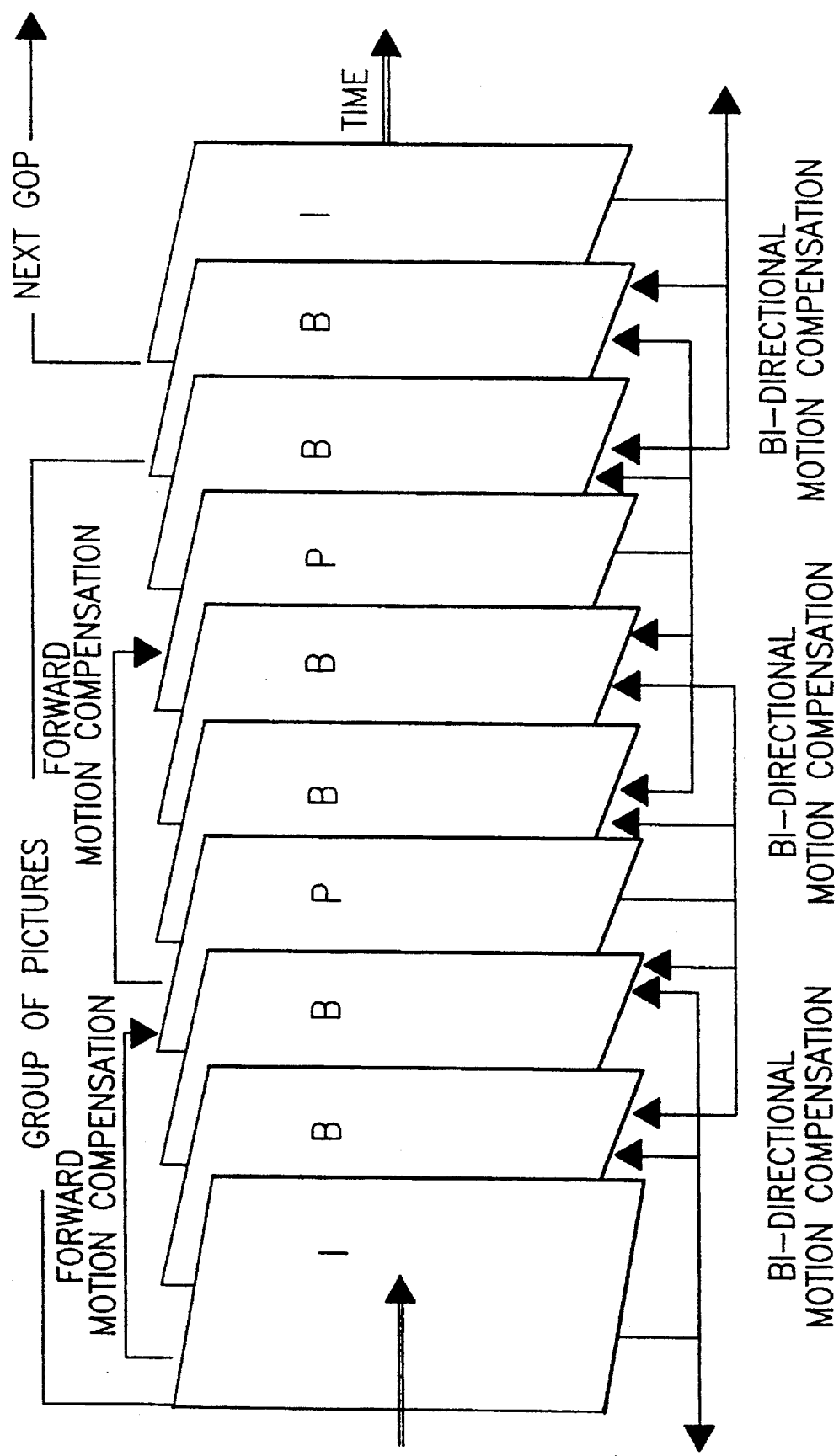
FIG. 1 shows the three type of pictures and their relationship under the MPEG-2 Draft Standard, i.e., "I" Intrapictures, "P" Predicted Pictures, and "B" Birirectionally Predicted Pictures.
Figures 3, 10:
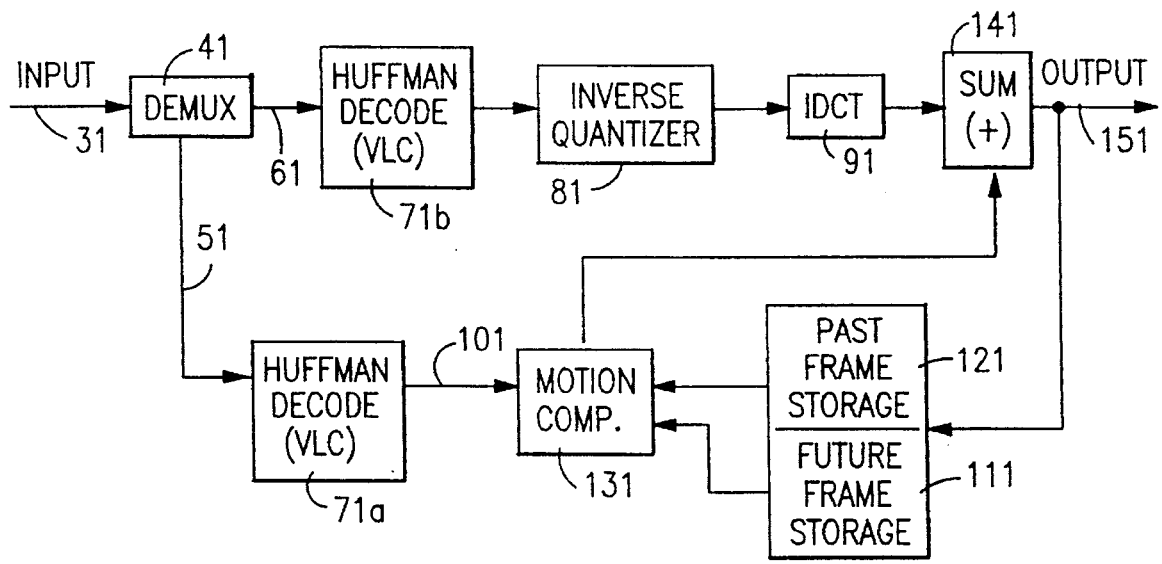
FIG. 3 is a logical flow diagram showing the general logical flow of the MPEG-2 Draft Standard compliant decoder.
FIG. 10 is a representation of the determination of bits read by the controller.

FIG. 3 shows the general internal data flow of the system of the prior art to support the MPEG-2 Draft Standard. Specifically, the compressed, encoded data input 31 goes to a demultiplexer 41 where it is demultiplexed into two streams 51 and 61. Stream 61 goes to a Variable Length Code (VLC) Huffman Decoder 71b for decoding, and to an Inverse Quantizer 81 for dequantizing. The dequantized code then goes to an Inverse Discrete Cosine Transform (IDCT) process 91, where the dequantized code is transformed into a pixel mapping.

The second data stream 51 also goes through a Variable Length Code (VLC) Huffman Decoder 71a where it is decoded into error functions 101 which go to a Motion Compensator 131. The Huffman Decoders 71a and 71b are shown as logically separate and distinct, although they may structurally and electronically the same element.

The Motion Compensator 131 also receives a data stream derived from the first data stream 61 and the motion compensated data stream, summed in Summer 141. The output 151 of the Summer 141 goes to the pixel bus (not shown) and to storage, i.e., Future Frame Storage 111 and Past Frame Storage 121. The contents of the Future Frame Storage 111 and Past Frame Storage 121 are, as appropriate, inputs to the Motion Compensator 131.

Figure 4:
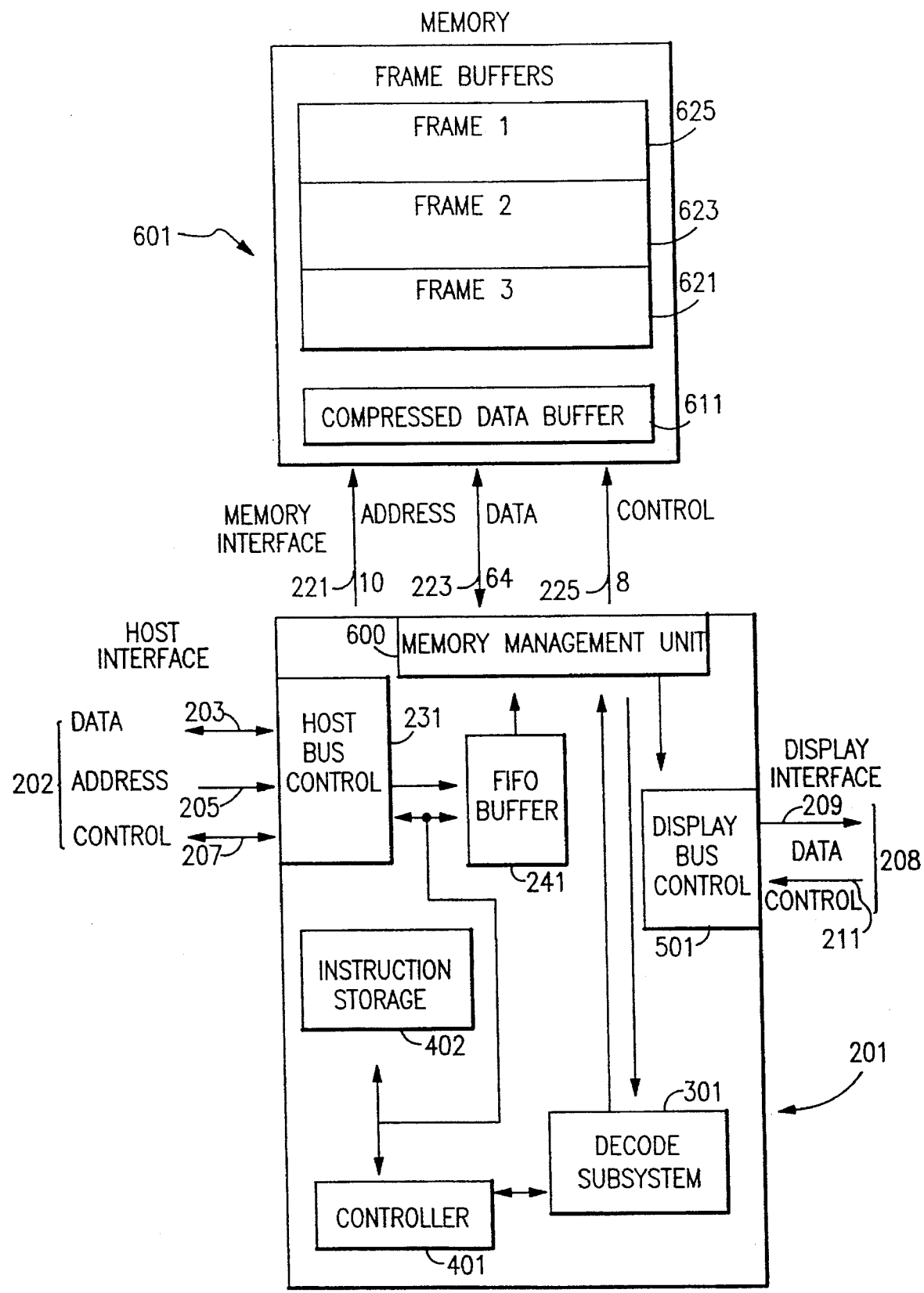
FIG. 4 is a block diagram of the functional units of the MPEG-2 Draft Standard compliant decoder of the invention.

FIG. 4 shows the block diagram of the decoder system 201 of the invention. The system I/O includes three busses from the host interface 202 and two busses to the display interface 208. The buses from the host interface 202 include the data bus 203, the address bus, 205, and the control bus, 207. The data bus 203 may be a 16 bit or a 32 bit bus, or of some other width, and it may be bidirectional or unidirectional. The address bus 205 is a 6 bit bus, although other widths may be accommodated without departing from the invention. The control bus 207 is a 7 bit bus, although other widths may be accommodated without departing from the invention.

The display interface 208 busses are the data bus 209 and the control bus 211. The data bus 209 is for pixel data. The control bus 211 is for synchronization and control.

The system includes a host bus control element 231, a FIFO buffer 241, a decode subsystem 301, a controller 401, an instruction storage unit 402, a display bus control 501, and a Memory Management Unit 600.

The memory, an external memory 601, includes a Compressed Data Buffer 611 for receiving data from the host interface 202 via the FIFO buffer 241, and frame buffers 621, 623, and 625, for receiving and storing decoded frames, including future frames and past frames.

The interface between the memory management unit 600 and the memory 601 includes an address bus, 221, a bidirectional data bus, 223, and a control bus 225.

Figure 5:
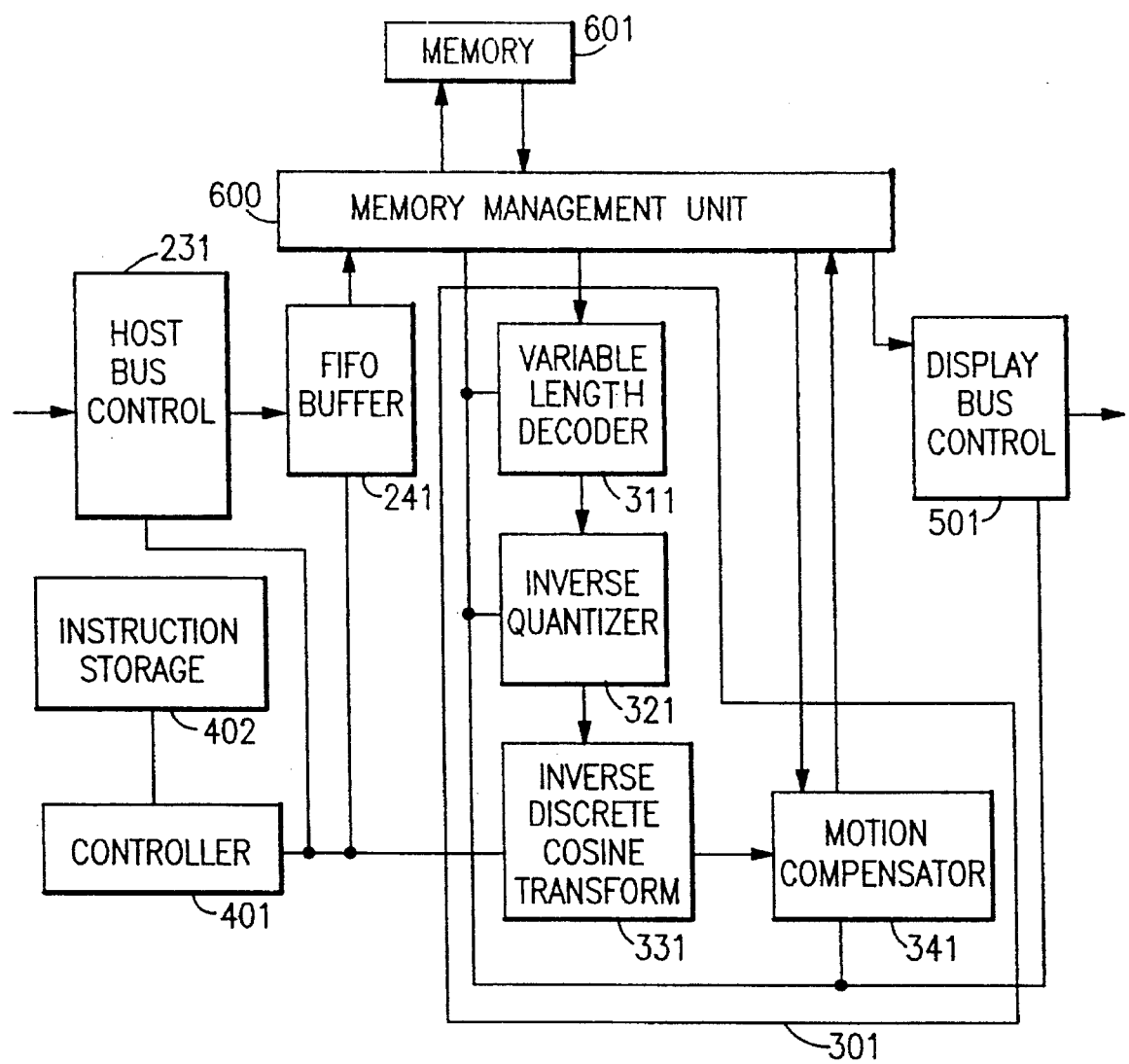
FIG. 5 is a block diagram of the decode subsystem of the MPEG-2 Draft Standard compliant decoder of the invention.

The decode unit 301, shown with detail in FIG. 5, consists of functional units that operate under the control of the controller 401 and its associated Instruction Storage Unit 402. These decode functional units include the Variable Length Code Huffman Decoder 311, the Inverse Quantizer or Dequantizer, 321, the Inverse Discrete Cosine Transform unit, 331, and the Motion Compensation Unit, 341.

As will be described more fully, the controller 401 is the central point of control for the decoder. The controller 401 microcode is stored in an Instruction Storage unit 402. The controller 401 interacts with the host system through an external processor through the host or system bus for high level commands and status. The controller 401 is responsible for the control and command of the other functional elements, as well as providing global synchronization of these units.

The controller 401 is coupled to the Variable Length Code Huffman Decoder 311. This enables parsing of the code stream. Parsing of the code streams and processing of header information is done by the controller 401 interacting with the VLC Huffman Decoder 311.

The Variable Length Code Huffman Decoder 311 (VLC) contains tables for decoding the data stream and a local state machine that controls the decoding of run/level data for macroblocks. The VLC 311 is controlled by the controller 401 as header information and block run/level symbols are passed from the compressed bit stream. A local state machine decodes the run/level symbols and interacts with the Inverse Quantizer 321 to process the decoded signals.

To be noted is that variable length coding, e.g., Huffman coding, is a statistical coding technique that assigns codewords to symbols. Symbols with a high probability of occurrence are assigned short codewords, while symbols with a low probability of occurrence are assigned longer codewords.

The codes used in the MPEG-2 VLC decoder are taken from the MPEG-2 Draft Standard. The codes form a class of codes known as prefix codes. In a prefix code system, no valid code is a prefix of another code. The number of bits assigned to each codeword is variable, from a minimum of 1 to a maximum of 16. The coded bits used to represent a sequence of symbols are a variable length string of bits. This bit string must be decoded sequentially in order to reconstruct the original sequence of symbols. As noted above, Huffman coding generates code tables based on symbol occurrence probabilities. The codes generated are minimum redundancy codes. The Huffman coding used by the MPEG-2 Draft Standard is based on a static coding algorithm. The coding procedure used by Huffman Coding is lossless coding, because the exact sequence of symbols encoded is recovered by the decoding process.

The Inverse Quantizer 321 receives run/level (run/amplitude) coded symbols from the VLC unit 311 and outputs a block of 64 coefficients that are sent to the Inverse Discrete Cosine Transform Unit 331. The Inverse Quantizer 321 converts the run/level coded symbols to zeros and symbols, unzigs the data, handles differential pulse code modulation (DPCM) decoding for the Discrete Cosine coefficients, and dequantizes the data.

FIG. 2 shows the zig-zag scanning order of the Discrete Cosine Transform coefficients. The top left coefficient is the DC coefficient. All other coefficients are considered as AC terms. The numbers indicate the order in which the coefficients are read for run length and level coding.

The process after run length coding is to "unzig" the data. This means placing the "level" data in the correct positions relative to an 8 by 8 block or matrix. The "run" identifies the number of skipped positions, i.e., zeros. The levels also need to be further processed under quantization.

In quantization, that is, in encoding, the level is divided by a number called the "quantization factor" to become a quantized coefficient. Quantization and dequantization introduce some degree of loss into the decoded data. In the decoding process, the unzigged quantized coefficient ("level") will be multiplied by the quantization factor to produce a dequantized coefficient. This coefficient, a frequency domain value, will go to the Inverse Discrete Cosine Transform unit 331 to be transformed back to a time domain based signal.

Intra blocks, also known as I-Pictures or as I-frames, contain DC coefficients that are Differential Pulse Code Modulation coded. This means that the DC value of the previous value predicts the current 8 by 8 block DC value. The quantized difference is then coded. The Differential Pulse Code Modulation coding for the DC coefficient is applicable for all three components, i.e., the Y component, the Cb component, and the Cr component. After Differential Pulse Code Modulation decoding, the DC coefficients of the 8 by 8 block will go through the inverse quantization process before being sent to the Inverse Discrete Cosine Transform unit 331.

Figure 22:
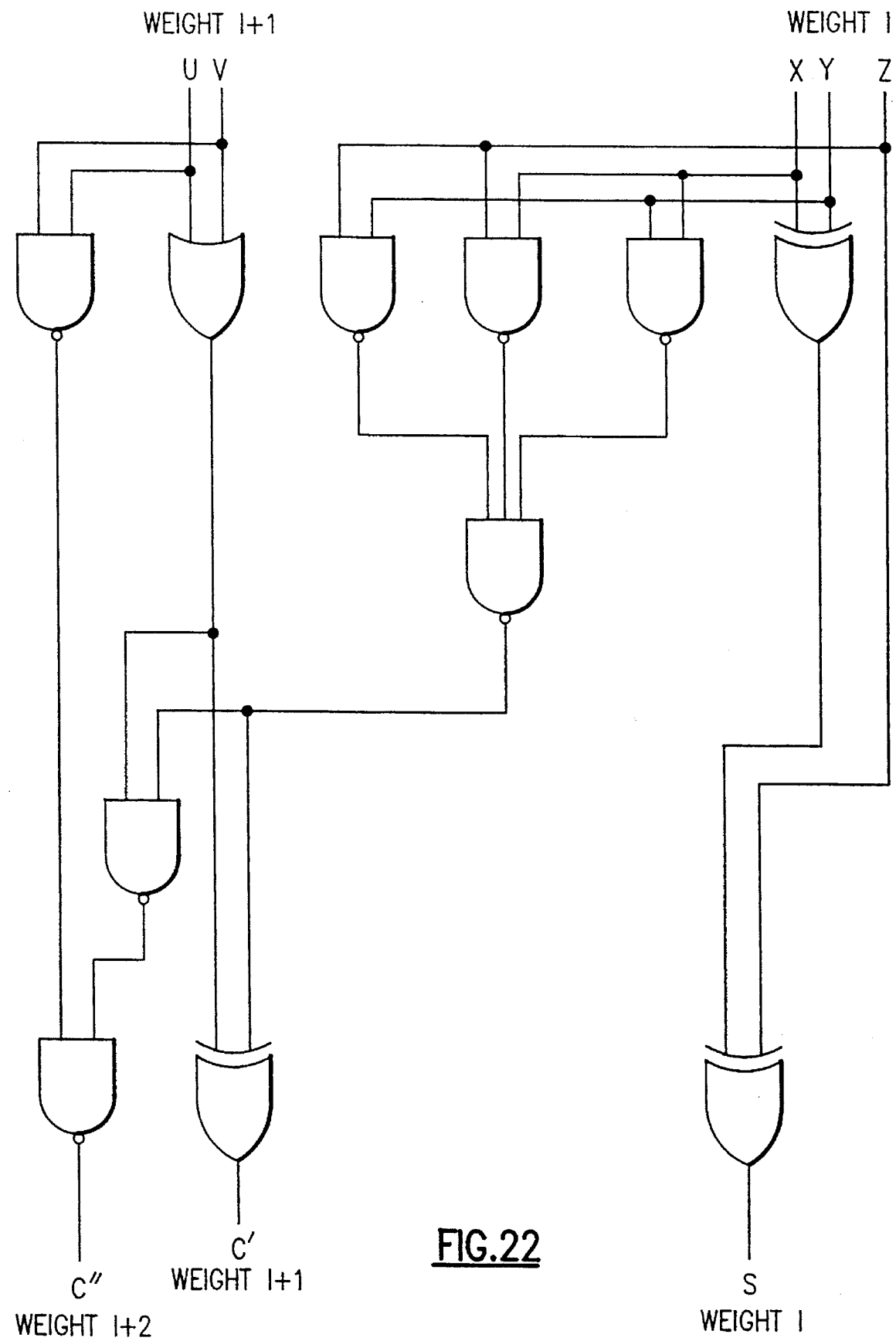
FIG. 22 is the logical diagram for the (2,3,3) parallel counter used in the Inverse Quantizer according to the invention.

The Inverse Quantization can utilize multiplication circuits using (2,3,3) parallel counters. In integrated circuits multiplication occurs in three stages. The first stage requires generation of partial product terms. The second stage sums the partial products from N bits to 2 bits. The third stage adds the final two bits per bit position via a carry look ahead adder to achieve the final numerical result. The total delay of a multiplication is the sum of the delays of all three stages. The second stage, summing the partial products from N bits to 2 bits, has the longest delay. As the clock cycle time for the electronic devices is shortened, the sum of the three stages must also shorten in order for the multiplication of two numbers to occur within a single clock cycle. This is especially true for the inverse quantizer, which is a multiplication intensive step. The (2,3,3) parallel counter used in the inverse quantizer has the logical structure shown in FIG. 22, and represented by the Boolean terms:

$C''$=(U NAND V) NAND ((U XOR V) NAND ((X NAND Y) NAND (X NAND Z) NAND (Y NAND Z))), $C'$=(U XOR V) XOR ((X NAND Y) NAND (X NAND Z) NAND (Y NAND Z)), and s=(x XOR Y) XOR Z.

After a block of signals have been dequantized in the Dequantizer unit 321 the Inverse Discrete Cosine Transform unit 331 performs a two dimensional inverse discrete cosine transform on the 8 by 8 block to form a reconstructed image block. The reconstructed image block is added to the predicted block from the Motion Compensation Unit 341 if required. The Inverse Discrete Cosine Transform Unit 331 and the Motion Compensation Unit 341 synchronize their outputs during this summation step. The summation results are then sent to the memory 601 for output to display and for reference.

The Motion Compensation Unit 341 receives commands and address from the controller 401 and performs the required interpolations to form predicted image blocks. The predicted output block is synchronized to the output of the Inverse Discrete Cosine Transform and added to the output of the Inverse Discrete Cosine Transform reconstructed block by this summation step.

Motion compensation exploits the temporal redundancy in video pictures by coding the difference between a current block and a block in a previous picture or in a future picture. Motion within a picture means the pels will be in a different location than in the reference picture. This displacement is given by motion vectors. These motion vectors and the coded difference between the current and the future picture construct the motion compensated picture.

Motion compensation includes prediction from past, or future, or both past and future pictures, utilizing motion pels of full pel or half pel accuracy. Motion compensation is carried out in both interlaced and non-interlaced video data streams.

Dedicated Function Environment

Figure 6:
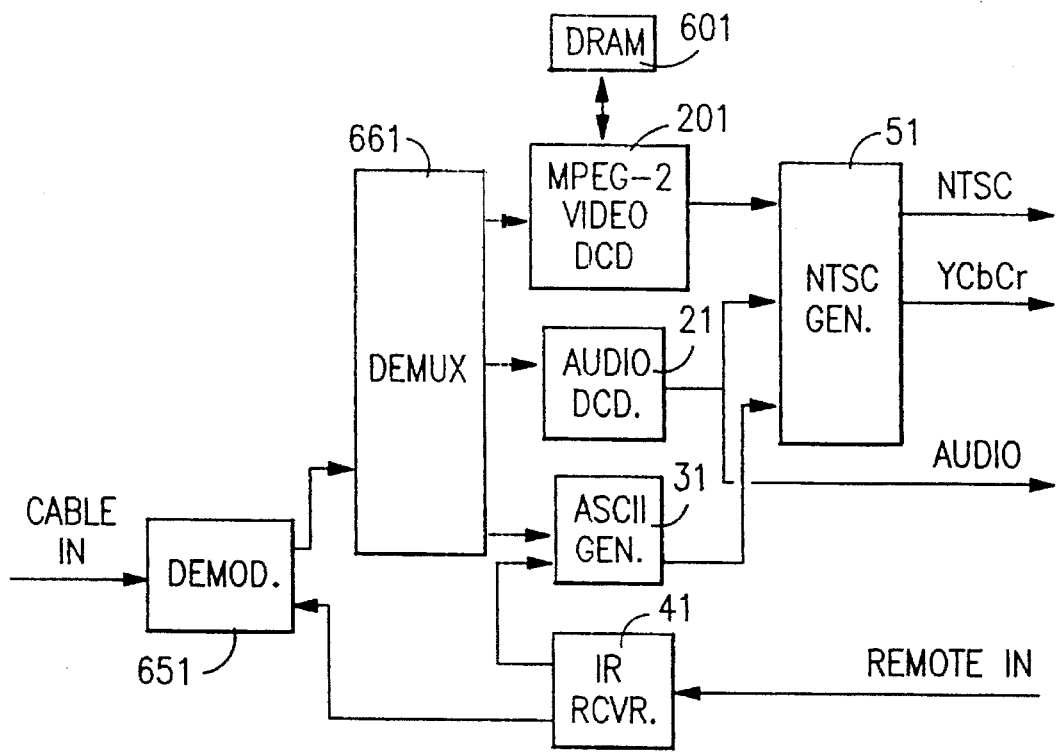
FIG. 6 is a block diagram of the decoder of the invention in a dedicated or television set top box environment.

The decoder system of the invention is shown in a dedicated, digital entertainment terminal environment in FIG. 6. The system receives input from the cable or upstream broadcasting means 651. This is demultiplexed into video, audio, and ASCII portions in demultiplexer 661. The system includes the video decoder 11 of the invention, an audio decoder 21, an ASCII Generator 31, and an Infrared Receiver 41. The ASCII Generator 31, the Audio Decoder 41, and the Video Decoder 11 provide outputs through the NTSC (National Television Standards Committee) generator 51

Personal Computer Environment

In a personal computer, workstation, or other computation environment the compressed video data input comes from either a storage device or a network communications adapter. The video data is typically handled as a packet transfer across a system I/O bus. This means that the system of the invention must be capable of receiving bursts of data at high rates for a limited time, and then allow other devices to use the system I/O bus while the encoded data is being processed. This is accomplished through the use of the internal FIFO buffer 241 which must be large enough to handle such data bursts. In a computation environment the decompressed video data stream is provided on the display (Pixel Bus) Interface, which can directly interface to a video controller. Alternatively, the video data stream can be sent on a high bandwidth system bus to a graphics processor frame buffer.

Figures 7, 12:
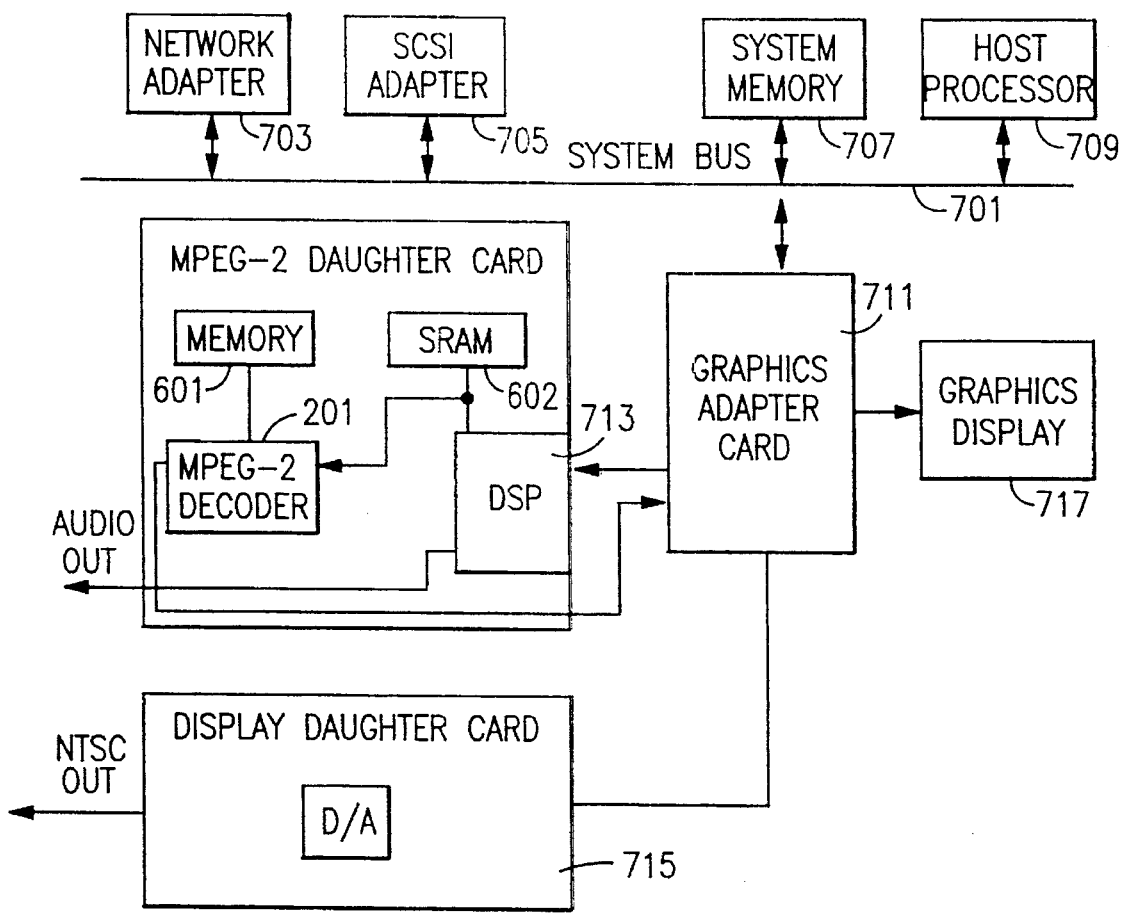
FIG. 7 is a block diagram of the decoder of the invention in a personal computer environment.
FIG. 12 is a representation of the operation of the Modulo Add with F-Code Range Adjustment.

A typical PC system environment is shown in FIG. 7. The FIGURE shows the system bus 701, with various system bus subsystems, e.g., a network adapter 703, a SCSI adapter 705, a system memory 707, and a host processor 709. The system of the invention is connected to the system bus 701 through a graphics adapter card 711 and includes a digital signal processor 713, the decoder 201 of the invention, DRAM 601, and SRAM 602 The Graphics Adapter Card 711 provides interface to an optional Display Daughter Card 715, to a Graphics Display 717, or to both.

Processor I/O

The system has three external interfaces, a host interface 202, a display interface 208, and a memory interface 221, 223,225.

The host interface 202 is the primary control and compressed data interface. This interface 202, a 16 bit slave interface, provides host processor, i.e., transmission network, access to the internal registers, local storage, and functional units of the system. The Host Interface 202 functions as the command, status, and encoded data interface for the system. High level systems commands and status are passed between the decoder system of the invention and the host system through this host interface 202.

The host interface 202 provides a generic interface protocol to the host, that appears as a register port interface.

The host interface 202 includes the address, data, and control pin out. The pin outs include address, data, chip select, write pulse, output enable, FIFO buffer full, system clock, timer clock, and reset. The chip select pin indicates that the chip is being selected for register access. The write pulse is an instruction to either receive data from the host or write data to the host. Output Enable is used to tristate the Host data bus, allowing the chip to drive the host data bus. FIFO Buffer Full is only used for dynamic, synchronous operation, as in a PC environment.

The System clock is an oscillator that provides timing for the internal processor and operations. This clock does not affect the Host Interface control signals which are asynchronous with respect thereto. The timer clock is an externally generated clock signal that synchronizes the video with the audio. Reset is a power on reset signal.

The host bus carries signals that initialize the decoder, by resetting the chip, setting the chip mode, setting display parameters, loading Display Instruction Storage, starting the decoder processor, loading compressed data into the FIFO buffer, setting the system clock reference, and starting the decoder.

The Memory Interface supports direct attachment to a local memory that stores multiple frames of decompressed video data, partially decoded pictures, and compressed input data. Reference pictures used for motion compensation are stored in External Memory 601. The system input is stored in a compressed data buffer 611, which may be part of the External Memory 601. The compressed data buffer 611 is loaded from the host bus interface 202 and read into the Variable Length Coder 311 under the control of the controller 401.

The Display or Pixel Bus Interface 208 is the primary interface for passing decompressed video image data to a downstream unit, such as a display unit, or a graphics interface card, that will ultimately be responsible for displaying the video.

This consists of 16 bits of pixel data output, and control inputs FLDID, the field ID; PCLK, the Pixel Clock; CB, the composite blank, which indicates the inactive portion of each line; and POE, the Pixel Output Enable, generated externally and used by the decoder to control the drivers to the output.

Controller Overview

The controller 401 controls the functional elements of the decoder system 201. The controller 401 is a Reduced Instruction Set Controller element with a minimal instruction set. In a preferred embodiment it is formed of a CMOS standard cell integrated circuit chip, although other implementations may be used. Critical to the controller is the minimal instruction set described herein with branching to match the MPEG-2 Draft Standard layers.

Video decompression standards, such as the MPEG-2 Draft Standard, utilize a video decoder to receive an encoded, compressed, serial bit stream, and translate the encoded, compressed serial bit stream into a sequence of moving pictures. As described herein, the syntax of the bit stream is hierarchical, using a layered structure to define decoding parameters to be used for an entire sequence, for a group of pictures, for an individual picture or pictures, and for the motion vectors.

The MPEG-2 Draft Standard syntax allows many possibilities of encoding techniques, and allows for extensions to the syntax itself for future changes. Therefore, a video decoder must be flexible enough to allow reception of these various types of streams, while being very cost competitive.

According to the invention disclosed herein a specialized controller 401 controls a specialized decompression and decoding system 201 of the invention. The controller 401 reads out each parameter from the encoded, compressed bit stream, in real time, and makes decisions upon the decoding at every level of the architecture. The controller 401 allows the use of a limited set of instructions, i.e., a reduced instruction set, in order to keep the decoding system small and cost effective.

The controller 401 provides a Read Symbol Instruction that provides direct read control from the encoded bit stream. This allows fast processing since the Read Symbol Instruction works closely with the rest of the system in reading the bit stream in real time while simultaneously being able to make decisions within the execution cycle without further bit or character tests to achieve the flexibility necessary for supporting the MPEG-2 Draft Standard syntax.

The controller 401 also has Fast Branching control for the Read Symbol Instruction. This allows specialized decision making based upon the current parameter being read out of the encoded, compressed bit stream.

The controller 401 also has Modulo-Add with F code adjustment. This reduces the software steps for motion vector calculations.

The encoded, compressed bit stream consists of a concatenation of parameters. Many of these parameters are represented by a variable length code (VLC). The variable length code requires translation to an expanded number of bits. The parameters are grouped together and separated by start bits, which are code points that have a fixed number of zeros preceding some unique value. The start codes separate the layers and extensions in the encoded video standard, i.e., the MPEG-2 Draft Standard.

Figure 8:
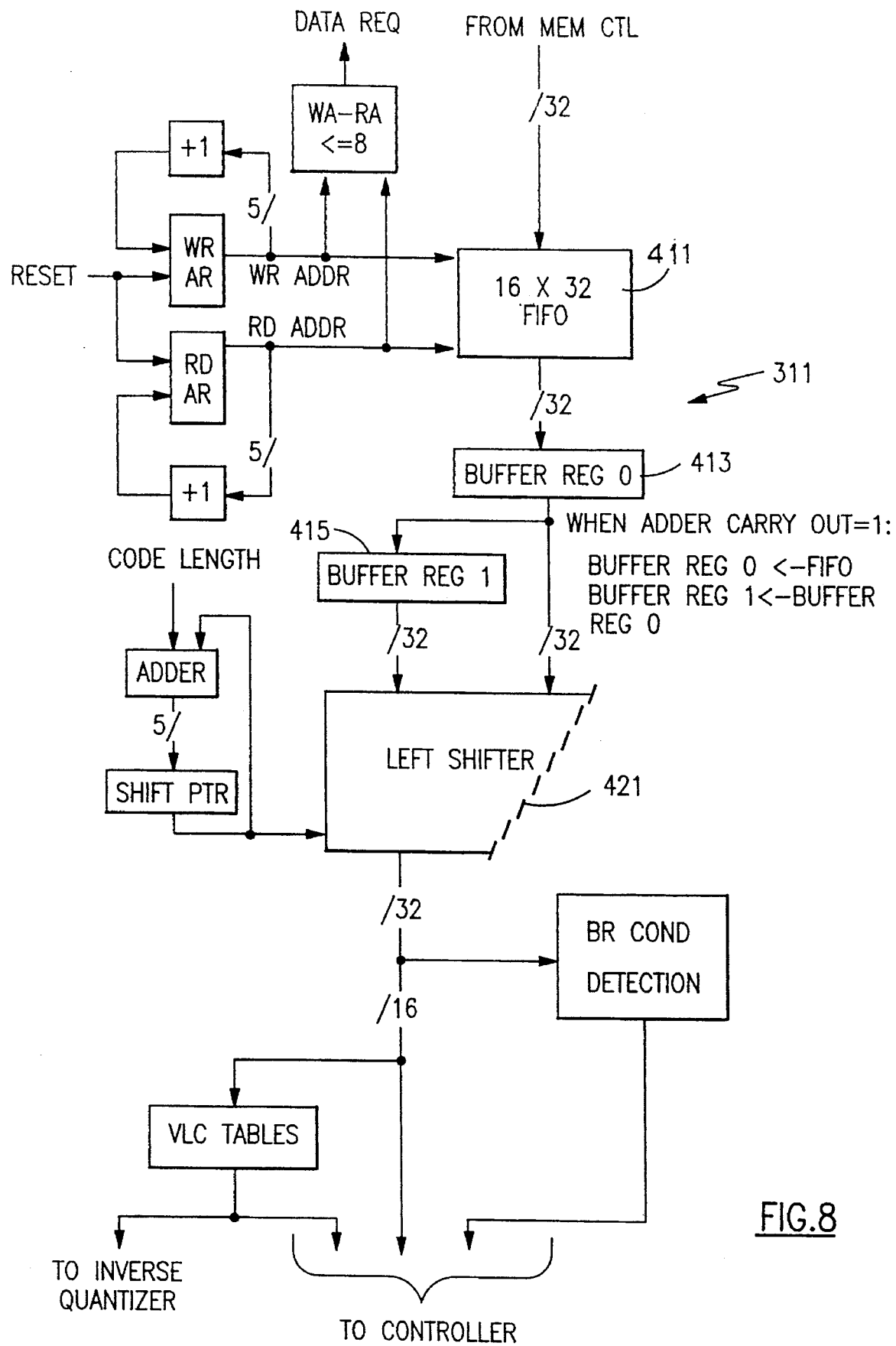
FIG. 8 is a representation of the front end bit stream logic located in the variable length decoder.

The controller 401 participates in the read of every parameter that is presented. The front end bit stream logic located in the VLC is shown in FIG. 8. Hardware is used to feed the encoded bit stream from the memory, into a FIFO buffer 411, and then into registers 413 and 415 in order for the controller 401 to perform the Read Symbol Instruction. The left shifter 421 allows the controller 401 to see the most recent 16 bits of the bitstream left justified. The bit stream is otherwise unmodified.

Figure 9:
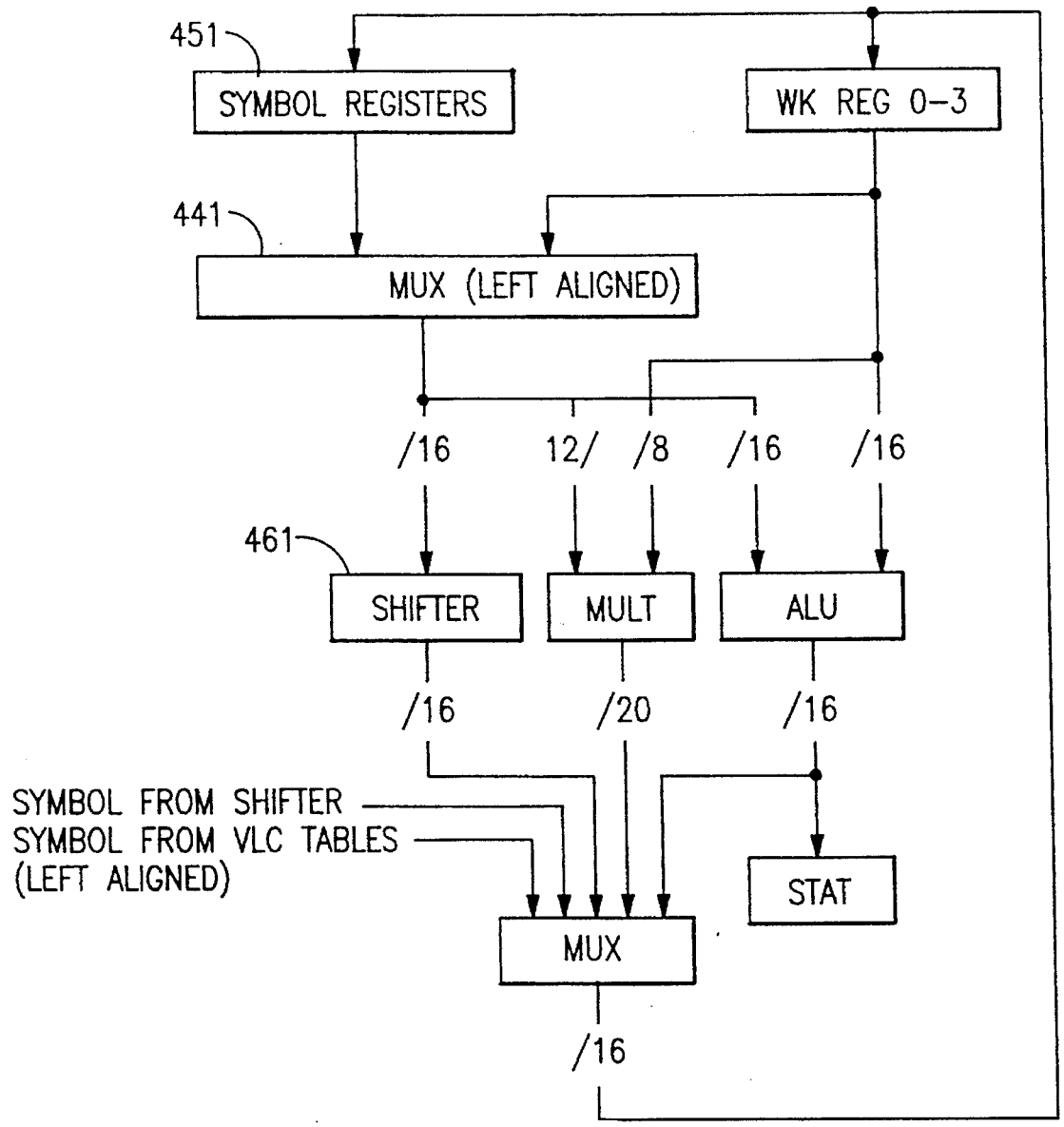
FIG. 9 is a representation of the controller.

The controller 401 receives either (1) the output of the shifter 421, or (2) the decoded value of the shifter output. The decoded value of the shifter output is obtained from the VLC decoder by VLC tables. The output of the shifter 421 goes through a multiplexer and the result is placed in a symbol register 451, shown in FIG. 9.

The execution of the Read Symbol Instruction performs the following:

a. the resultant symbol, either VLC Huffman decoded or straight bits, is placed in register 451 or sent to inverser quantizer;

b. the number of bits eliminated (read) from the encoded bit stream is determined; and c. the shifter 421 adjusts so that the next parameter is now left justified for another Read Symbol Instruction.

Determination of the number of bits read from the encoded bit stream is accomplished by a length field in the instruction, by the address of the register, or by the VLC decoder. This becomes the code length, which is used by the shifter 421 to position the next parameter in the bit stream so that it is now left justified for the controller 401. FIG. 10 shows how this address can be used to determine the number of bits that have been read.

The power of the Read Symbol Instruction is further enhanced by giving it the capability of performing decisions based upon the status of the current parameters in the bit stream. This is accomplished through the Continue, Stay, or Skip branching control.

CONTINUE means to execute the current instruction and then go onto the next instruction. STAY means to repeat the same instruction until a condition is true. SKIP means to execute the current instruction and if a condition is true, bypass the next sequential instruction and execute the one that follows.

STAY allows reduction of the number of instructions when it is necessary to read out a large block of parameters. There is no need to insert test and branch instructions in a loop. The loop can be accomplished in a single word. The loop is broken by the condition changing from false to true as parameters are read out.

SKIP allows conditional branching without the insertion of additional test and branch instructions. The condition itself forces the branch.

Figure 11:
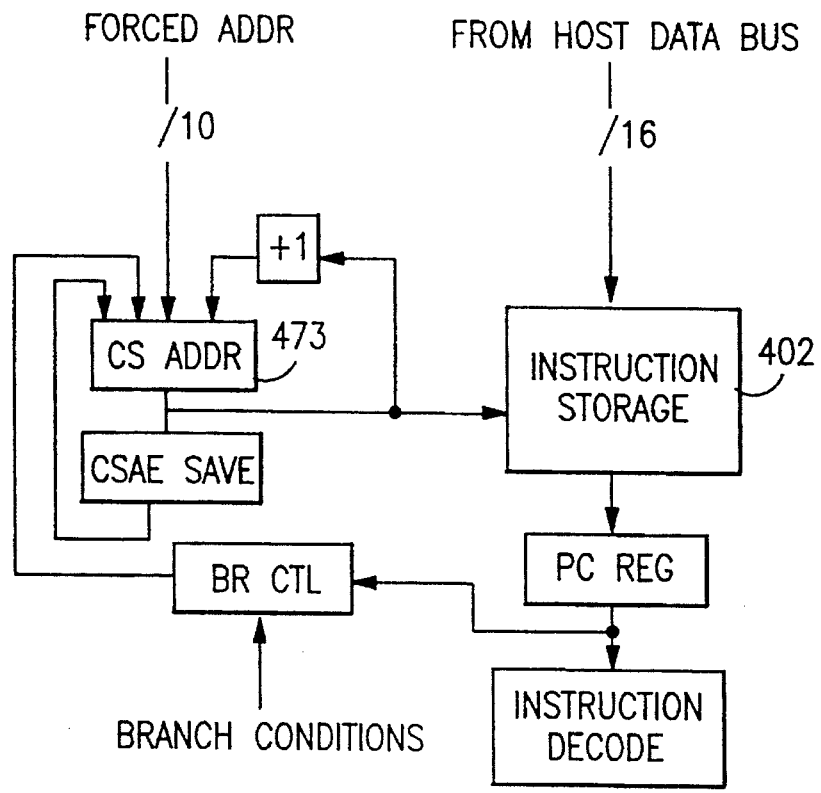
FIG. 11 is a representation of the hardware used for branching in the controller.

FIG. 11 shows the hardware used to perform branching. The instructions are read in an Instruction Storage Unit 402, and the next instruction is addressed by the CS_ADDR register 473. During the Read Symbol Instruction, the normal increment of the CS_ADDR register 473 can be overridden by the branch condition caused by the execution of the Read Symbol Instruction.

The Modulo Add With F-Code Range Adjustment is a special function designed to minimize the number of instructions necessary for motion vector calculation. The F-Code is a parameter from the encoded bit stream. It specifies a range of bits to be used in the motion vector calculation. Once it is read into a register as a symbol, the F-Code is used by the system to modify the position of the most significant bit during addition. This eliminates the need for software to do shifts, back and forth, during time critical calculations. This is illustrated in FIG. 12.

Controller Architecture

Immediate commands allow direct control of hardware units. A specific command can be presented to all hardware units, with only one hardware unit recognizing the command. The command can be sent to the hardware using the immediate instruction type, with the constant field being one out of a possible sixty four specific commands. This permits the software to have additional control and/or flexibility in carrying out the decode process.

The controller 401 has seven word types, an IMMEDIATE word type, an ADD word type, a SPECIAL ARITHMETIC word type, a SHIFT word type, a READ SYMBOL word type, a BRANCH word type, and a BRANCH RETURN word type. The word types are identified by bits 0-2 thereof. This is shown in Table 2, below.

TABLE 2

| Word Types and Instruction Bits 0-2 | |
|---|---|
| WORD TYPE | BITS 0-2 |
| IMMEDIATE | 000 |
| ADD | 001 |
| SPECIAL ARITHMETIC | 010 |
| SHIFT | 011 |
| READ SYMBOL | 100 |
| BRANCH | 101 |
| BRANCH RETURN | 110 |

FIG. 13 shows the IMMEDIATE word type command format, with the function field {Bits 3-4}, a Low Byte Field {Bit 5}, a Working Register Address Field {Bits 6-7} when the Function Field is not indicating a Load Command, and a Command Type Field {Bits 6-7} when the Function Field {Bits 3-4} is indicating a Load Command. Bits {8-15} carry a constant.

The IMMEDIATE word allows an 8 bit constant to be applied to a Work Register by either a direct loading or a logical function. The Work Field Register is used to indicate which work register is to be used in the operation. For the Load function (Bits 3-4=00), the work register field indicates which work register is the destination. For the logical functions, the work register field is used as the source. The result of a logical function is always destined to Work Register 0.

Note that the constant is only 8 bits wide, while the work registers are 16 bit registers. The High/Low field, bit 5, indicates which byte the constant should operate on, and which byte of the result should be destined. When the bit is 0 the high order byte is used, and when the bit is 1 the operation is on the low order byte.

When the Function field, bits 3-4, indicates a Load Command operation, i.e., when bits 3-4 equal 11, the work field register is used to indicate the command type.

FIG. 14 shows the ADD word type command format, with a 001 in bits 0-2, a Subtract field in bit 3, and a Carry-In Control field in bits 4-5. The Work Register Address field is bits 6-7 when the Carry In Control is not a Special Add, and controls Increment By 1 and Decrement By 1 when the Carry In Control field is a Special Add. Bit 8 is a Destination Field, and bits 9-15 are the Symbol Address.

The ADD word performs addition or subtraction on two 16-bit operands. The A-operand is indicated by the Symbol Address Field, bits 9-15, and the B-operand is indicated by the Work Register field, bits 6-7. The result is always destined to Work Register 0 if the bit in the destination field is 0. If the bit in the Destination Field is 1, the Symbol Address field, bits 9-15, is used as a destination address as well as a source address.

The Subtract field, bit 3, indicates whether a subtraction is to be performed. When bit 3 is 0, an addition is performed. When bit 3 is 1, a subtraction is performed. The subtraction is performed by inverting the B-operand before the hard wired addition is performed. The Carry In Control, bits 4-5, is used to perform 2's complement subtraction and addition of numbers more then 16 bits if needed. When performing a two's complement subtraction, the carry in is set to 1. When adding two 32 bit numbers the lower 16 bits are added first. The carry-out is saved and used as the carry for the high order 16 bit add.

There are symbol registers that are 20 bits wide. The adder can add a 16 bit value to the 20 bit symbol and destine the result to a 20 bit symbol. If the result is destined to a 16 bit register, then the high order four bits are lost.

The ADD word also performs the "increment by 1" and "decrement by 1" functions. When the Carry In Control field is 11, the Work Register field is used to indicate the special add functions, i.e., Increment by 1 or Decrement by 1. The selected symbol register is either incremented by 1 or decremented by 1, depending on the special add function.

FIG. 15 shows the SPECIAL ARITHMETIC Word Type command format. This is a powerful command. Bits 3-5 are the Function field, and control such functions as Clear, Move, Load Positive, Load Negative, Multiply, and Modulo Add. Bits 6-7 indicate the work register. Bit 8 indicates the destination. Bits 9-15 indicate the Symbol Address field.

The SPECIAL ARITHMETIC WORD performs special arithmetic operations. If the operation is a single operand operation, the source operand is the Symbol Address or the work register. When the bit in the destination Field is 0, the Symbol Address Field indicates the source operand and the Work Register field selects the destination register. If the bit is 1, the Work Register is used as the source and the Symbol Address identifies the register to be destined.

The Special Arithmetic Word can call the functions CLEAR REGISTER, MOVE, LOAD POSITIVE, LOAD NEGATIVE, MULTIPLY, and F-CODE MODULO ADD.

CLEAR REGISTER clears the register specified by the symbol address or work register address. If the destination bit is 0 the register selected by the work register is set to 0. If the destination bit is 1, the symbol address selects the register to be cleared.

MOVE transfers contents between registers. When the destination bit is 0, MOVE moves the contents from the register selected by the symbol address to the work register selected by the work register field. When the destination bit is 1, MOVE moves the contents from the register selected by the work register field to the register selected by the symbol address field.

LOAD POSITIVE changes the source operand to a positive number if it is negative, but leaves the operand unchanged if it is positive. The result is destined to the selected register. The symbol register field or the work register field can be the destination address, depending on the setting of the destination bit.

LOAD NEGATIVE changes the source operand to a negative number if it is positive, but leaves the operand unchanged if it is negative. The result is destined to the selected register. The symbol register field or the work register field can be the destination address, depending on the setting of the destination bit.

MULTIPLY performs a 12 bit by 8 bit 2's-complement multiply. The 12 bit input comes from the register selected by the symbol address and the 8 bit input is from the work register. If the destination register is less than 20 bits, the high order bits, if any, will be lost. The result can be destined to either the symbol register or the work register, depending on the destination bit. The multiply utilizes the (2,3,3) parallel counter.

F-MODULO ADD performs addition and propagates the sign bit selected by the f-code. The A-input to the adder is from the symbol address and the B-input is from the work register address. The result can be destined to either the symbol register or the work register depending on the destination bit. This function is used when adding the calculated motion vector to the previous motion vector.

FIG. 16 shows the SHIFT Word Type command format. Bit 3 is the right shift field, differentiating between a right shift and a left shift. Bits 4 to 7 are the Shift Amount Field. Bit 8 is the destination Field. Bits 9 to 15 are the Symbol Address Field.

SHIFT performs the left or right shift on the operand indicated by the Symbol Address field by the number of bits indicated by the Shift Amount field. Like the ADD word, the destination field is used to indicate whether the Symbol Address is also used for destination. When the bit is 0, the result is always destined for Work Register 0. When it is 1, the result is destined to the register indicated by the Symbol Address. This allows data in a register to be shifted without an additional word. If the shift amount, bits 4–7, is set to 0, the 4 bits of the Shift Indirect register are used as the shift amount.

Since there are 20 bit symbol registers in the datapath, the shifter can source a 20-bit register and the result to another register. If the destination is only 16 bits wide, the high order 4 bits are lost. The shift amount is limited to 15.

FIG. 17 shows the READ SYMBOL WORD Type command format. Bits 3–6 can be the Fast Branch Condition Field (Branch Control bits 7–8 unequal 11) or the Symbol Length Field (Branch Control bits 7–8 equal 11). Bits 7–15 are the Symbol Address Field.

The command performs a logical shift except when it is a right shift, and the shift amount is 1, in which case an arithmetic shift is performed. This function is used to do a division by 2.

READ SYMBOL WORD parses the coded bit stream. While processing header information, symbols are read from the output of the bit stream shifter and destined to the symbol register indicated by the Symbol Address field. The Symbol Address also implies the length of the symbol if it is a fixed length symbol. If the symbol is a variable length coded symbol, the length is generated from the VLC tables. The length is used to update the pointer which is used to control the bit stream shifter. While processing run/level information, a symbol is read from the output of the bit stream shifter and destined to the symbol decoding pipeline.

Since READ SYMBOL WORD is frequently used, hardware branch assistance is provided to improve performance. The Branch Control allows the word to be repeated until the branch condition is met. It also controls the conditional skip so that the execution of the next word can be avoided.

When the Branch Control Field is 11, the Fast Branch Condition field becomes the length of the symbol to be read. The variable length code (VLC) hardware will use the length to control the bit stream shifter. The length implied by the symbol address is ignored. Under this condition the Branch Control defaults to Continue.

The Fast Branch conditions include Unconditional (branch condition is always true), FLAG BIT=0, which tests the next bit out of stream =0; the generation of this condition is from the left most bit of the stream shifter output), START CODE (detects the start code of 23 0's and one 1; the condition is generated from the left most 24 bits of the bit stream shifter), 23_ZEROS (this condition is true when there are 23 zeros at the output of the bit stream shifter output; this condition is used when reading the macroblock address; this condition can not be used immediately after a Read Symbol word); END_OF_BLOCK (this condition is used to determine the end of the block coefficients; the generation of this condition is from the left most 2 or 4 bits of the bit stream shifter output depending on which VLC format is used); END_OF_MACROBLOCK (this condition is generated when the macroblock is completed; the CBP register is set at the beginning of the macroblock; when a block is finished, the leftmost 1 bit is set to 0; when all of the bits are 0 and the block count is completed and the condition is generated; in the case of an intra-block, the CBP is set to all 1's), MBA_STUFFING or MBA_ESCAPE (this condition is used when reading the macroblock address; it allows the microcode to get out of the macroblock address read loop when a real macroblock address is found; it is generated from the left most bits of the bit stream shifter output); F-CODE=1 or VLC=1 (this condition is used to determine whether a motion vector residual is to be read or not; the condition is generated by detecting the f-code code register output=1 or the left most bit of the bit stream shifter output=1).

The fast branch controls include: CONTINUE (tells the control store to move onto the next sequential microword); STAY UNTIL CONDITION (this decode allows the instruction to be repeated many times until the condition is met; the fast branch condition is used to block the setting of the control store address and the control register); and SKIP ON CONDITION (this decode "no-ops" the execution of the next instruction if the branch condition is met).

FIG. 18 shows the BRANCH Word Type command format. Bit 3 is the Execute Field, and is 0 for a Branch (no execute on next word) and 1 for an execute on next word. Bits 4 to 6 are the Branch Condition Field. Bits 7 to 15 are the Branch Address Field.

BRANCH WORD performs a branching within a 512 word range. When the condition is indicated by the Branch Condition is met, the instruction storage address is set to the address indicated by the Branch Address field. When the Execute bit is 1, the word following the branch word will be executed while the branch target is being accessed. When the bit is 0, and the branch is successful, a dead cycle is introduced due to the lack of an instruction before the execution is resumed.

The BRANCH conditions include: UNCONDITIONAL (branch is always taken); WORK REGO=0/WORK REGO=0 (branch is taken based on contents of Work Register 0); CARRY OUT=1 (branch is taken if a carry out is generated by previous ADD operation; SIGN=0/SIGN =1 (branch is taken based on sign of the result of previous ADD or SHIFT operation); RESULT=0/RESULT=0 (branch is taken based on result of previous ADD, XOR or AND operation.

FIG. 19 shows the BRANCH RETURN word type. Bit 3 is the Execute field. Bit 4 is the Return field. Bits 5 and 6 are don't care bits. Bits 7 to 15 are the Branch Address Field.

BRANCH_RETURN performs a branching to a subroutine by the branch address and returns to the address following the Branch Return when a Return is specified in the subroutine. To get more performance, an Execute bit is included in the word. When the Execute Bit is 1, the word following the branch word will be executed while the branch target is being accessed. When the Execution bit is 0, execution is inhibited, and a dead cycle is introduced for accessing the branch target.

When the BRANCH RETURN word is being executed, the address for the word following the BRANCH RETURN word is saved in the CSAR Save register. This address is loaded into the Control Store Address register 473 when executing a Branch Return word with the Return bit set to 1.

FIG. 20 shows the Symbol Address Partition, and FIGS. 21A, 21B, 21C, 21D, and 21E are the Symbol Address Table.

While the invention has been described with respect to certain preferred embodiments and exemplifications, it is not intended to limit the scope of the invention, but solely by the claims appended hereto.

We claim:

1. A digital signal decoder system for receiving compressed encoded digital video signals and transmitting decompressed decoded digital video signals, said decoder system comprising:

a. a FIFO Data Buffer;
  b. a RAM having (1) a compressed, encoded Data Buffer connected to the FIFO Data Buffer and adapted to receive and store encoded compressed digital video data from the FIFO Data Buffer, and (2) a data portion for storing decompressed digital video data;
  c. a Memory Management Unit for managing the RAM;
  d. a Variable Length Code Decoder for receiving encoded data from the compressed, encoded Data Buffer portion of the RAM, and providing a decoded bit stream thereof;
  e. a (2,3,3) parallel counter Inverse Quantizer having the Boolean representation:
    C"=(U NAND V) NAND ((U XOR V) NAND ((X NAND Y) NAND (X NAND Z) NAND (Y NAND Z))),
    C'=(U XOR V) XOR ((X NAND Y) NAND (X NAND Z) NAND (Y NAND Z)) and
    S=(X XOR Y) XOR Z, where U, V, X, Y, and Z are inputs to the (2,3,3) parallel counter and C', C", S are outputs of the (2,3,3) parallel counter,
    for dequantizing the decoded data from the variable length decoder;
  f. an Inverse Discrete Cosine Transform Decoder for inverting the dequantized, decoded data into Intrapictures, Predicted Pictures, and Bidirectional predicted Pictures;
  g. a Motion Compensator for receiving Intrapictures and other information from the RAM, and error functions, and forming motion compensated predicted pictures therefrom for return to the RAM;
  h. a Display Unit to output motion compensated pictures from the RAM; and
  i. a Reduced Instruction Set Controller to control the Memory Management Unit, the Variable Length Code Decoder, the Inverse Quantizer, the Inverse Discrete Cosine Transform Decoder, the Motion Compensator, and the Display Unit.

2. A digital signal decoder system for receiving encoded digitized video signals and transmitting decoded digital video signals, said decoder system having a RAM with (1) a compressed, encoded Data Buffer adapted to receive and store encoded compressed digital video data, and (2) a data portion for storing decompressed digital video buffer, a Memory Management Unit for managing the RAM, and an integrated circuit chip comprising:

a. a FIFO Data Buffer;
  b. a Variable Length Code Decoder for receiving encoded data from the RAM compressed, encoded Data Buffer, and providing a decoded bit stream thereof;
  c. a (2,3,3) parallel counter Inverse Quantizer having the Boolean representation:
    C"=(U NAND V) NAND ((U XOR V) NAND ((X NAND Y) NAND (X NAND Z) NAND (Y NAND Z))),
    C'=(U XOR V) XOR ((x NAND Y) NAND (X NAND Z) NAND (Y NAND Z)), and
    S=(X XOR Y) XOR Z, where U, V, X, Y, and Z are inputs to the (2,3,3) parallel counter and C', C", S are outputs of the (2,3,3) parallel counter,
    for dequantizing the decoded data from the variable length decoder;
  d. an Inverse Discrete Cosine Transform Decoder for inverting the dequantized, decoded data into Intrapictures, Predicted Pictures, and Bidirectional predicted Pictures;
  e. a Motion Compensator for receiving Intrapictures and other information from the RAM, and error functions, and forming motion compensated predicted pictures therefrom for return to the RAM;
  f. a Display Unit to output motion compensated pictures from the RAM; and
  g. a reduced instruction set Controller to control the Memory Management Unit, the Variable Length Code Decoder, the Inverse Quantizer, the Inverse Discrete Cosine Transform Decoder, the Motion Compensator, and the Display Unit.

3. An integrated circuit chip for a system for receiving encoded digitized video signals and transmitting decoded digital video signals, said system including the integrated circuit chip and a RAM with (1) a compressed, encoded Data Buffer adapted to receive and store encoded compressed digital video data, and (2) a data portion for storing decompressed digital video buffer, a Memory Management Unit for managing the RAM, the integrated circuit chip comprising:

a. a FIFO Data Buffer;
  b. a Variable Length Code Decoder for receiving encoded data from the RAM compressed, encoded Data Buffer, and providing a decoded bit stream thereof;

c. a (2,3,3) parallel counter Inverse Quantizer having the Boolean representation:
   C"=(U AND V) NAND ((U XOR V) NAND ((X AND Y) NAND (X NAND Z) NAND (Y NAND Z))),
   C'=(U XOR V) XOR ((X AND Y) NAND (X NAND Z) NAND (Y NAND Z)), and
   S=(X XOR Y) XOR Z, where U, V, X, Y, and Z are inputs to the (2,3,3) parallel counter and C', C", S are outputs of the (2,3,3) parallel counter,
   for dequantizing the decoded data from the variable length decoder;
d. an Inverse Discrete Cosine Transform Decoder for inverting the dequantized, decoded data into Intrapictures, Predicted Pictures, and Bidirectional predicted Pictures;
e. a Motion Compensator for receiving Intrapictures and other information from the RAM, and error functions, and forming motion compensated predicted pictures therefrom for return to the RAM;
f. a Display Unit to output motion compensated pictures from the RAM; and
g. a reduced instruction set Controller to control the Memory Management Unit, the Variable Length Code Decoder, the Inverse Quantizer, the Inverse Discrete Cosine Transform Decoder, the Motion Compensator, and the Display Unit.

4. A digital entertainment system comprising a digital signal decoder system for receiving encoded digitized video signals and transmitting decoded digital video signals, said decoder system comprising:
a. a FIFO Data Buffer;
b. a RAM having (1) a compressed, encoded Data Buffer connected to the FIFO Data Buffer and adapted to receive and store encoded compressed digital video data therefrom, and (2) a data portion for storing decompressed digital video buffer;
c. a Memory Management Unit for managing the RAM;
d. a Variable Length Code Decoder for receiving encoded data from the RAM compressed, encoded Data Buffer, and providing a decoded bit stream thereof;
e. a (2,3,3) parallel counter Inverse Quantizer having the Boolean representation:
   C"=(U NAND V) NAND ((U XOR V) NAND ((X NAND Y) NAND (X NAND Z) NAND (Y NAND Z))),
   C'=(U XOR V) XOR ((X NAND Y) NAND (X NAND Z) NAND (Y NAND Z)), and
   S=(X XOR Y) XOR Z, where U, V, X, Y, and Z are inputs to the (2,3,3) parallel counter and C', C", S are outputs of the (2,3,3) parallel counter,
   for dequantizing the decoded data from the variable length decoder;
f. an Inverse Discrete Cosine Transform Decoder for inverting the dequantized, decoded data into Intrapictures, Predicted Pictures, and Bidirectional predicted Pictures;
g. a Motion Compensator for receiving Intrapictures and other information from the RAM, and error functions, and forming motion compensated predicted pictures therefrom for return to the RAM;
h. a Display Unit to output motion compensated pictures from the RAM;
i. a reduced instruction set Controller to determine the state of the FIFO Data Buffer and to control the Memory Management Unit, the Variable Length Code Decoder, the Inverse Quantizer, the Inverse Discrete Cosine Transform Decoder, the Motion Compensator, and the Display Unit;
j. an audio decoder unit; and
k. an output unit chosen from a television set, a recorder, a computer, and a network for rebroadcast.

5. An Inverse Discrete Cosine Transform video decoder having a variable length decoder, an inverse quantizer, and an inverse discrete cosine transform transformer, the improvement wherein the inverse quantizer comprises (2,3,3) parallel counters, each having the Boolean representation
   C"=(U NAND V) NAND ((U XOR V) NAND ((NAND Y) NAND (X NAND Z) NAND (Y NAND Z))),
   C'=(U XOR V) XOR ((X NAND Y) NAND (X NAND Z) NAND (Y NAND Z)), and
   S=(X XOR 7) XOR Z, where U, V, X, Y, and Z are inputs to the (2,3,3) parallel counter and C', C", S are outputs of the (2,3,3) parallel counter.

\* \* \* \* \*